(12) United States Patent
Greifeneder et al.

(10) Patent No.: US 8,234,631 B2
(45) Date of Patent: Jul. 31, 2012

(54) METHOD AND SYSTEM FOR TRACING INDIVIDUAL TRANSACTIONS AT THE GRANULARITY LEVEL OF METHOD CALLS THROUGHOUT DISTRIBUTED HETEROGENEOUS APPLICATIONS WITHOUT SOURCE CODE MODIFICATIONS

(75) Inventors: Bernd Greifeneder, Linz (AT); Markus Pfleger, St.Johann/Wbg (AT)

(73) Assignee: dynaTrace Software GmbH (AT)

( * ) Notice: Subject to any disclaimer, the term of this patent is extended or adjusted under 35 U.S.C. 154(b) by 1021 days.

(21) Appl. No.: 12/191,409

(22) Filed: Aug. 14, 2008

(65) Prior Publication Data

US 2009/0049429 A1 Feb. 19, 2009

Related U.S. Application Data

(60) Provisional application No. 60/955,654, filed on Aug. 14, 2007.

(51) Int. Cl.
*G06F 9/44* (2006.01)
*G06F 9/45* (2006.01)

(52) U.S. Cl. .................. 717/128; 717/159; 717/151

(58) Field of Classification Search .......... 717/124–129, 717/149–153
See application file for complete search history.

(56) References Cited

U.S. PATENT DOCUMENTS

| | | | | |
|---|---|---|---|---|
| 6,266,805 B1 * | 7/2001 | Nwana et al. | ................. | 717/104 |
| 6,539,541 B1 * | 3/2003 | Geva | ............... | 717/150 |
| 6,754,890 B1 * | 6/2004 | Berry et al. | .................... | 717/128 |
| 6,978,444 B1 * | 12/2005 | Farchi et al. | ................... | 717/129 |
| 7,143,392 B2 * | 11/2006 | Ii et al. | ......................... | 717/125 |
| 7,376,940 B1 * | 5/2008 | Bush et al. | ..................... | 717/149 |
| 7,380,239 B1 * | 5/2008 | Srivastava et al. | ............ | 717/128 |
| 7,409,676 B2 * | 8/2008 | Agarwal et al. | ............... | 717/120 |
| 7,493,607 B2 * | 2/2009 | Moritz | ......................... | 717/151 |
| 7,496,903 B2 * | 2/2009 | Rees et al. | ..................... | 717/130 |
| 7,526,760 B1 * | 4/2009 | Daynes et al. | ................ | 717/153 |
| 7,685,183 B2 * | 3/2010 | Pace et al. | ..................... | 707/610 |
| 7,950,004 B2 * | 5/2011 | Vieira et al. | ................... | 717/125 |
| 7,992,133 B1 * | 8/2011 | Theroux et al. | ............... | 717/124 |
| 7,992,134 B2 * | 8/2011 | Hinchey et al. | .............. | 717/126 |
| 8,032,872 B2 * | 10/2011 | Violleau et al. | .............. | 717/149 |
| 8,037,458 B2 * | 10/2011 | Shekov | ......................... | 717/128 |

OTHER PUBLICATIONS

Kuang et al, "E AHRW: An energy efficient adaptive hash scheduler for stream processing on multicore servers", IEEE, pp. 45-56, 2011.*
Prabhu et al, "Using thread level speculation to simplify manual parallelization", ACM PPoPP, pp. 1-12, 2003.*
Ntarmos et al, "Distributed hash sketches: scalable efficient and accurate cardinality estimation for distributed multisets", ACM Trans. on Comput. Sys. vol. 27, No. 1, article 2, pp. 1-52, 2009.*
Olivier et al, "Scheduling task parallelism on multi socket multicore systems", ACM ROSS, pp. 49-56, 2011.*

* cited by examiner

*Primary Examiner* — Anil Khatri
(74) *Attorney, Agent, or Firm* — Robert Plotkin, P.C.

(57) ABSTRACT

The present invention provides a method and system for tracing and monitoring of distributed transactions spanning multiple threads or processes, running on multiple host systems, connected by a computer network. The correlation of distributed transactions is based on information that uniquely may identify execution paths within a virtual machine, additional to information which uniquely may identify the virtual machine that processes the execution path. The correlation information is transferred from a monitored thread to threads that are activated by the monitored thread and allows to reconstruct parent-child relations between different threads. Participating threads may run in different processes, in different virtual machines or on different host systems.

72 Claims, 26 Drawing Sheets

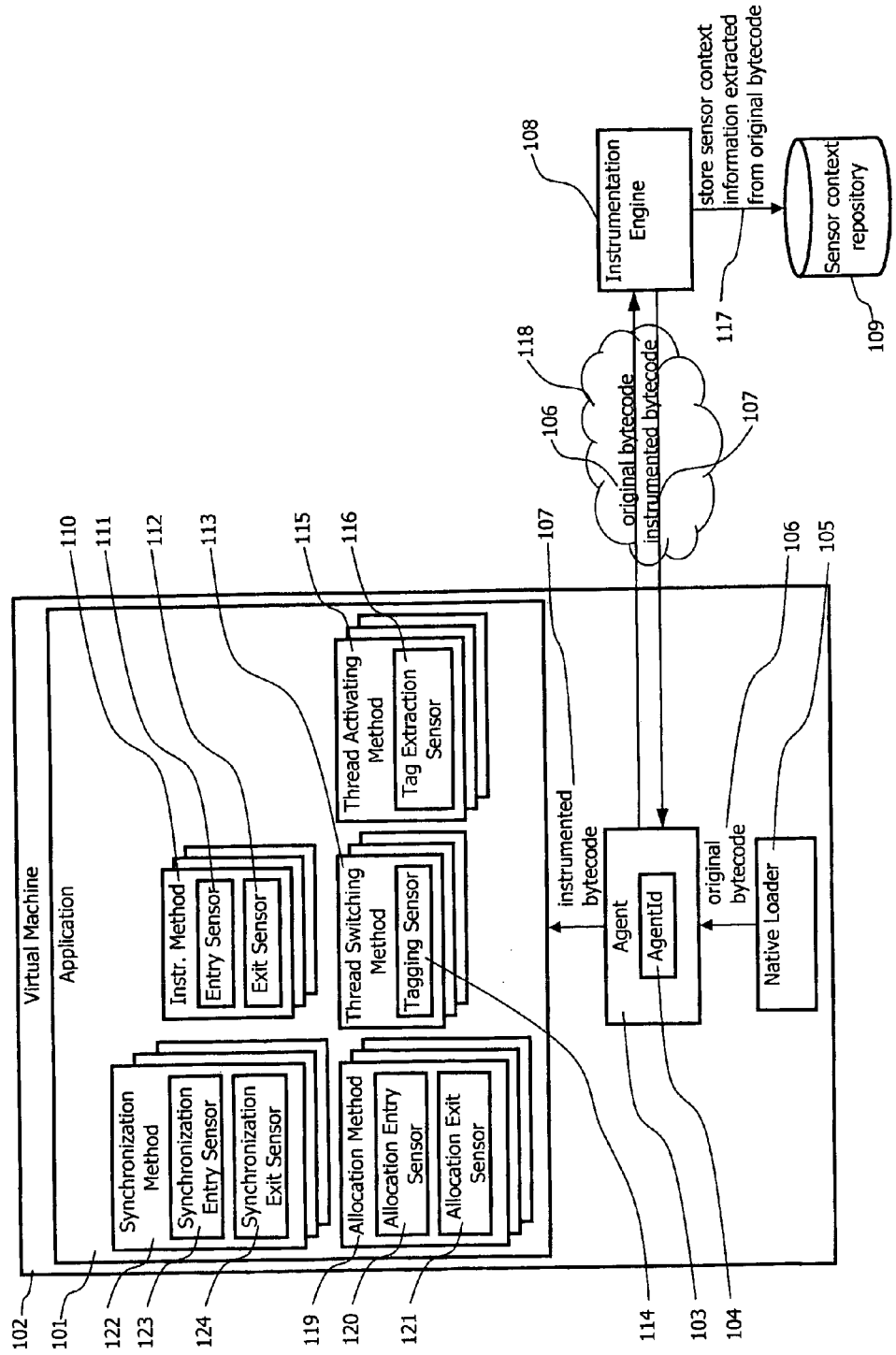

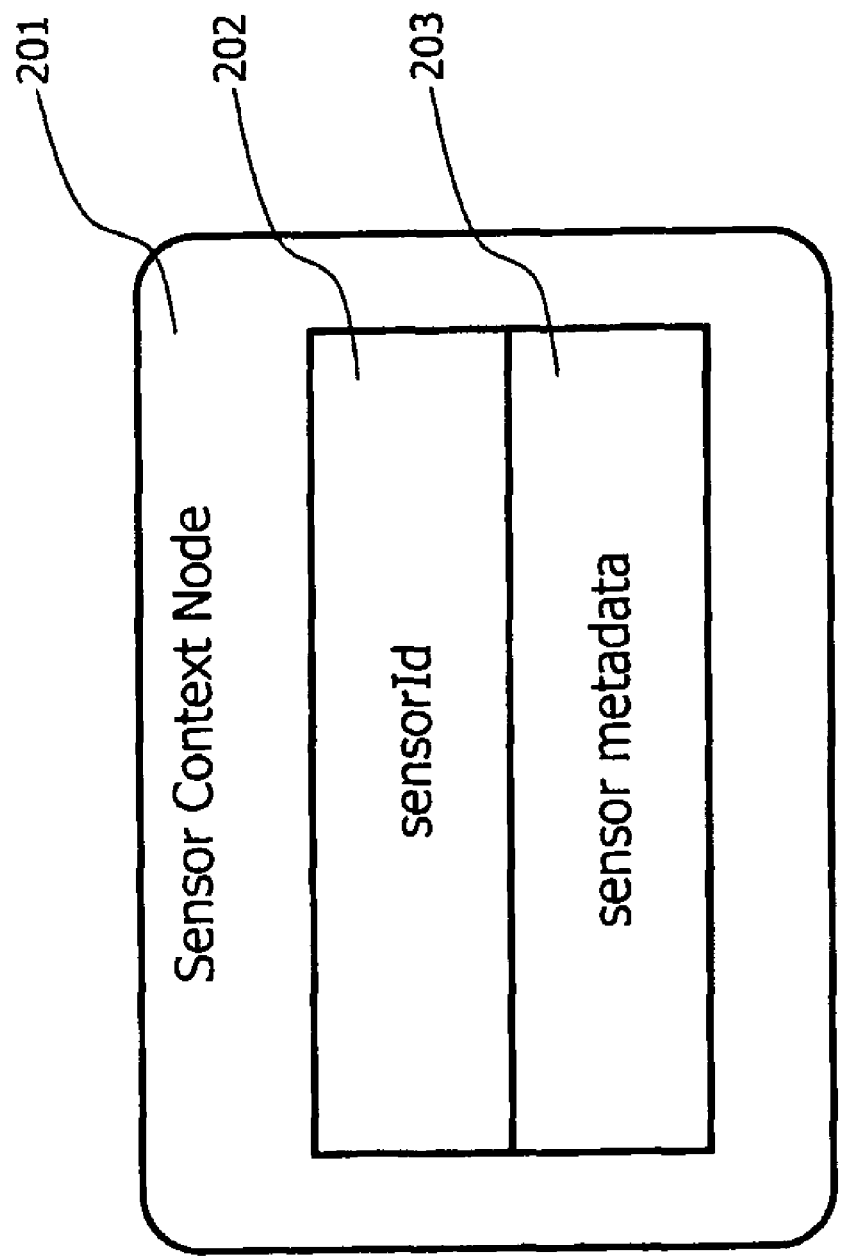
FIG 2: Sensor Context Node

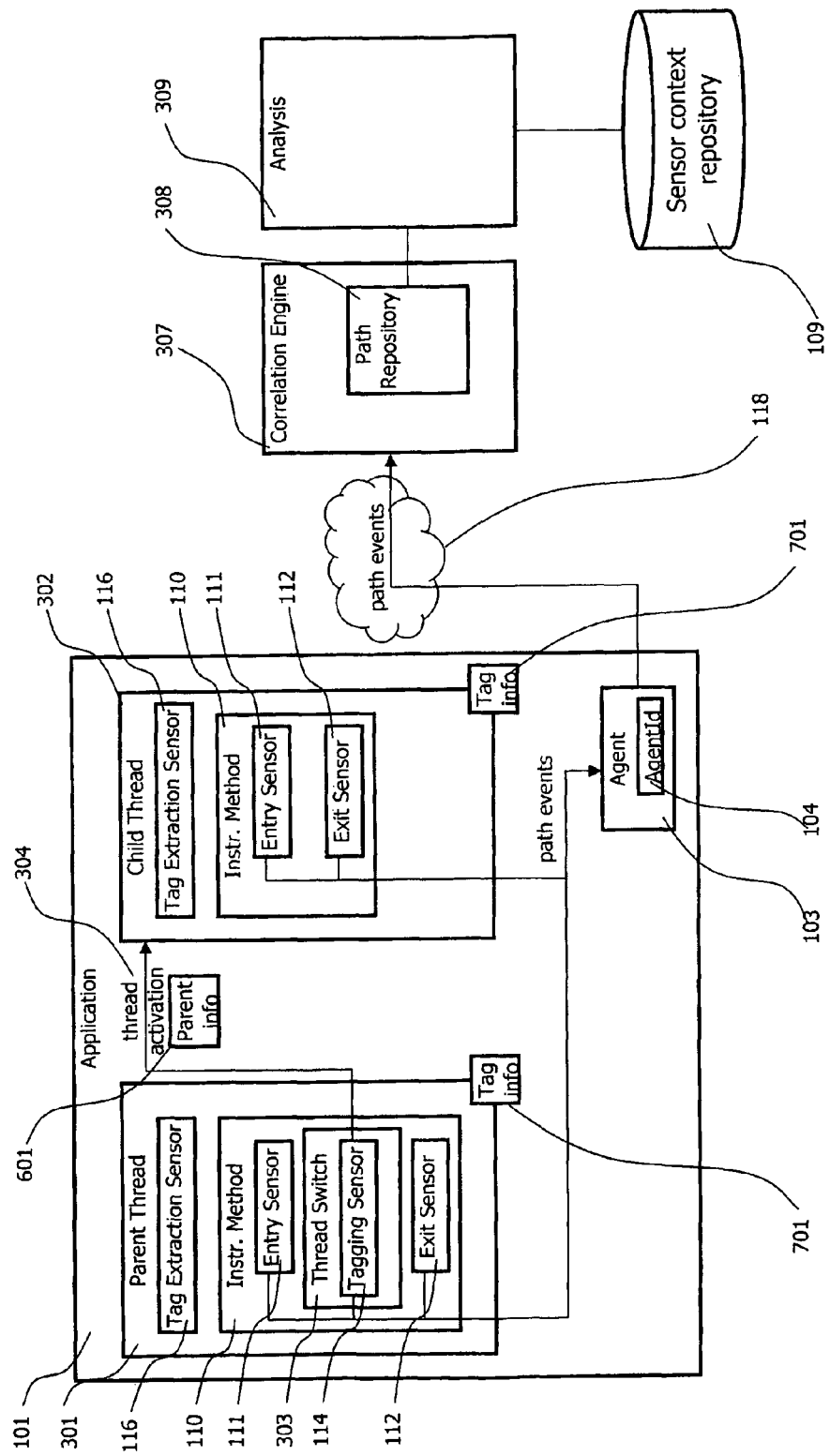

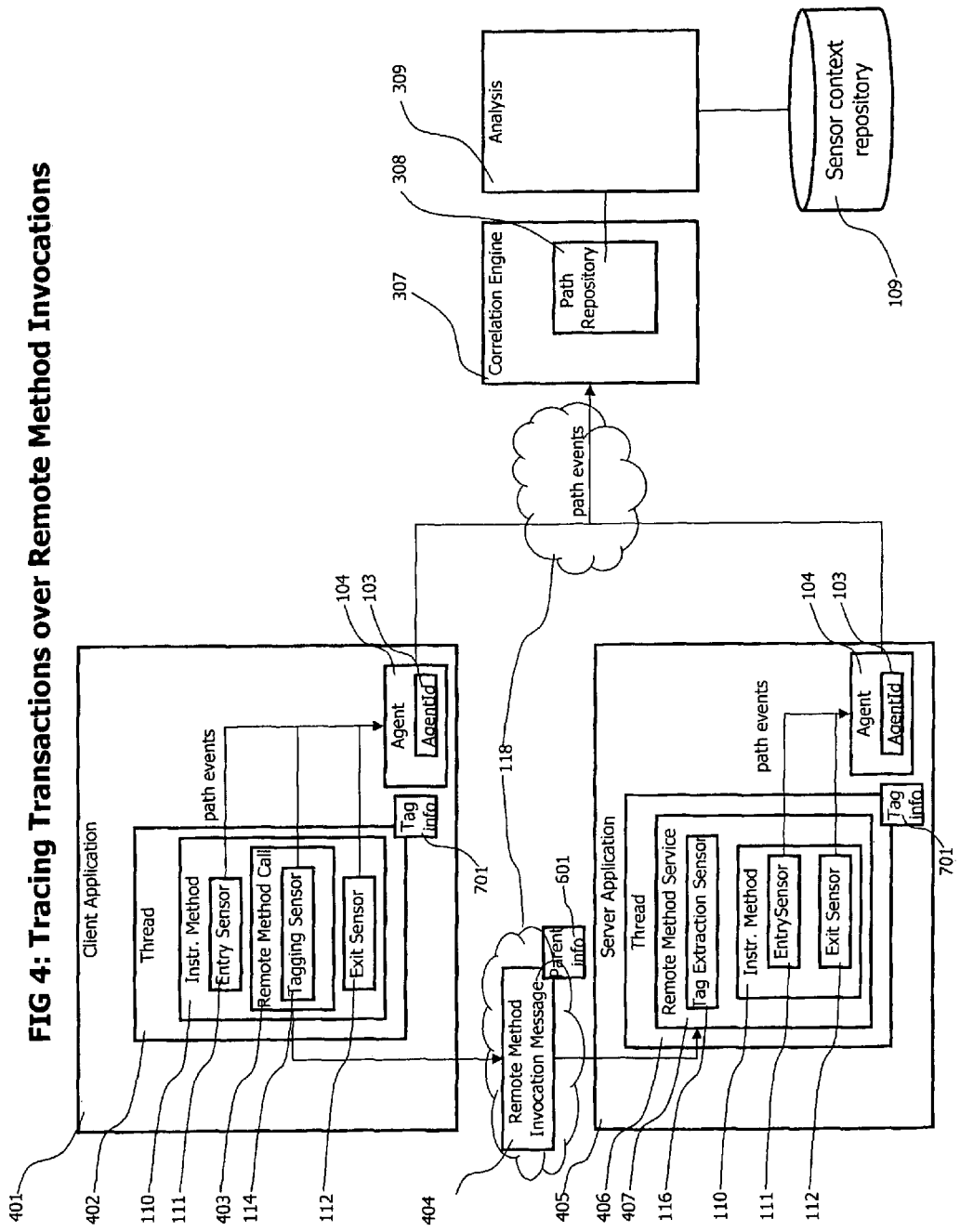
FIG 4: Tracing Transactions over Remote Method Invocations

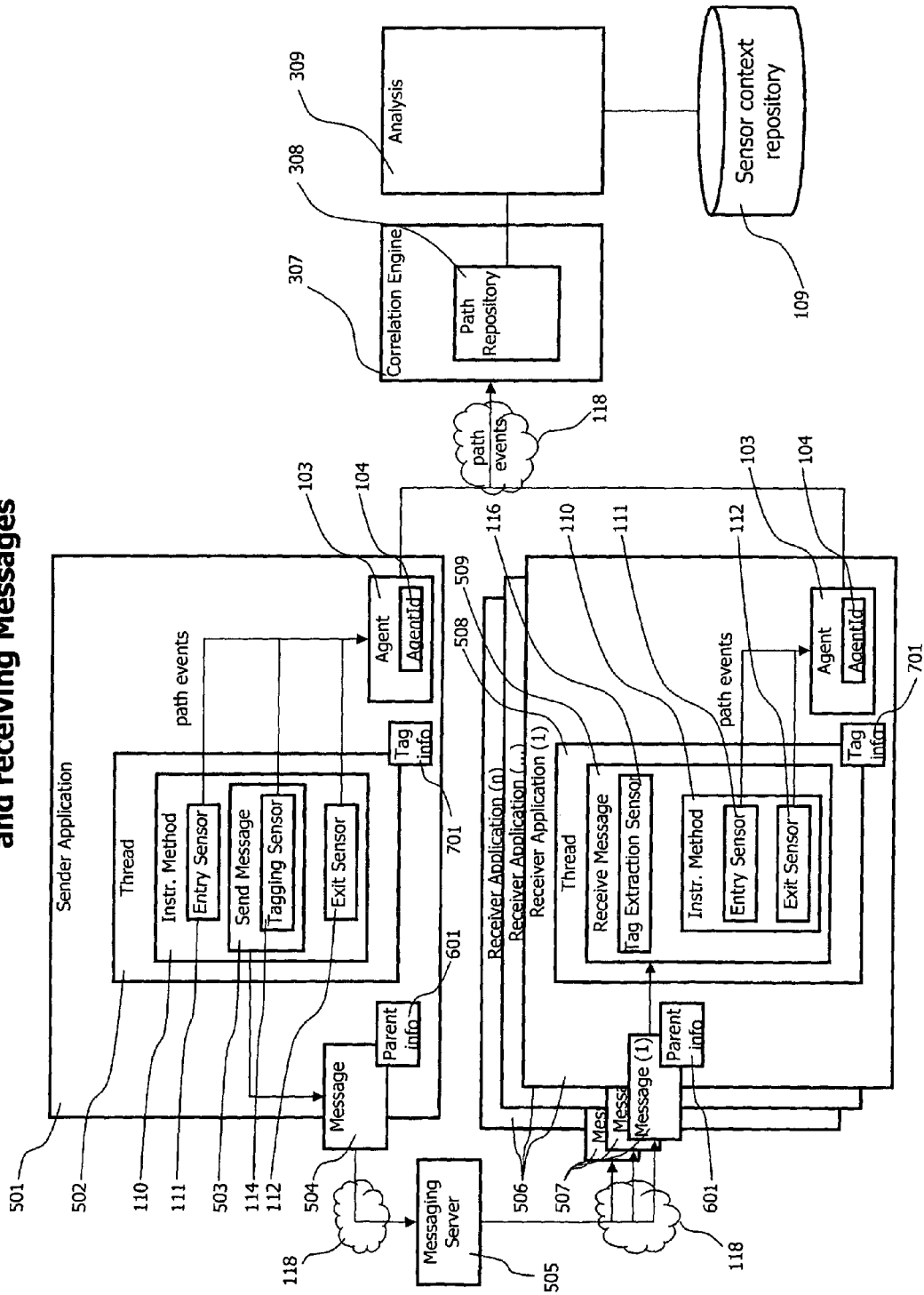

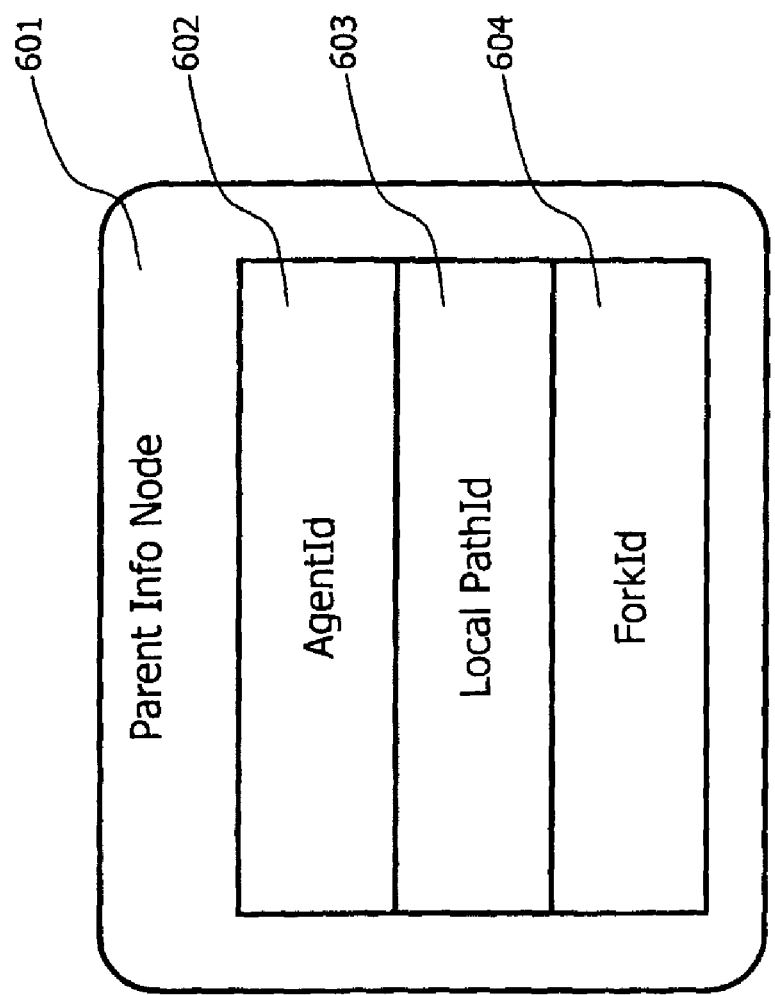
FIG 6: Parent Info Node

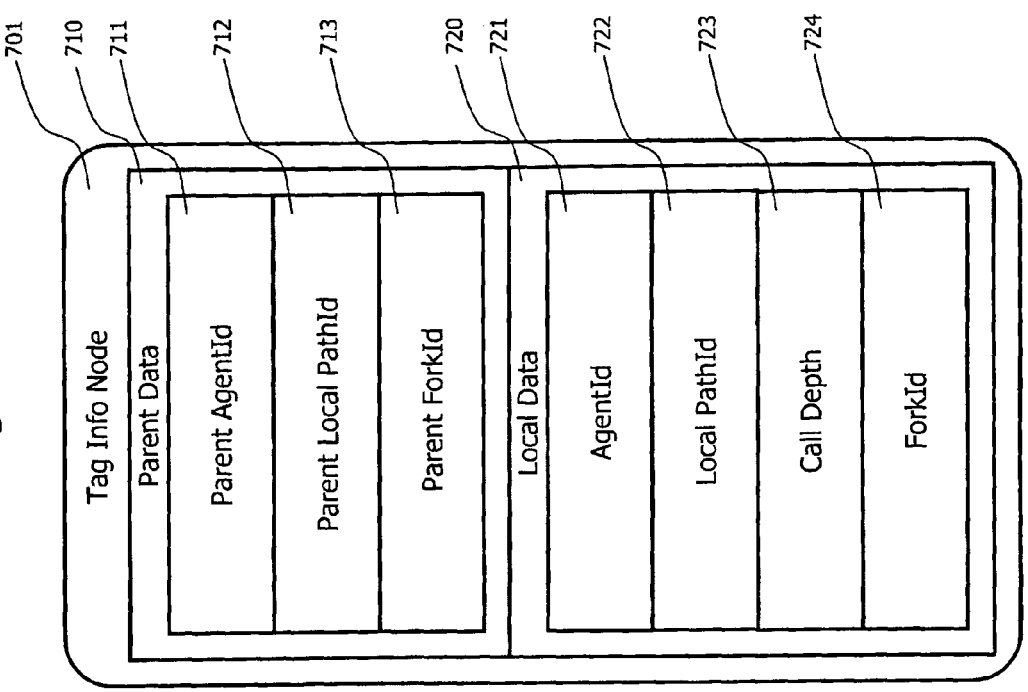
FIG 7: Tag Info Node

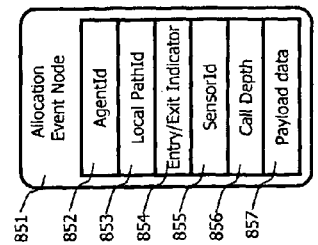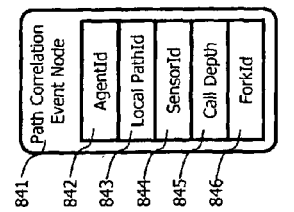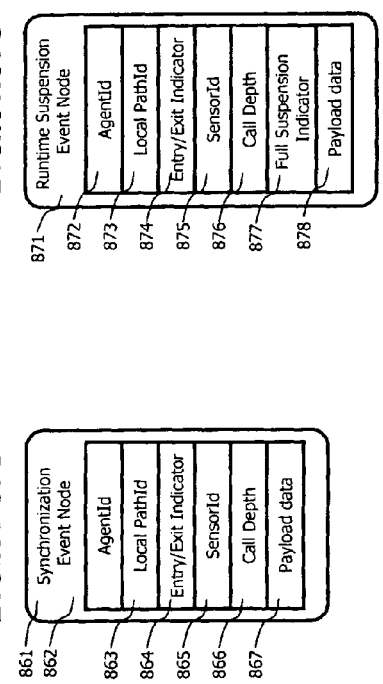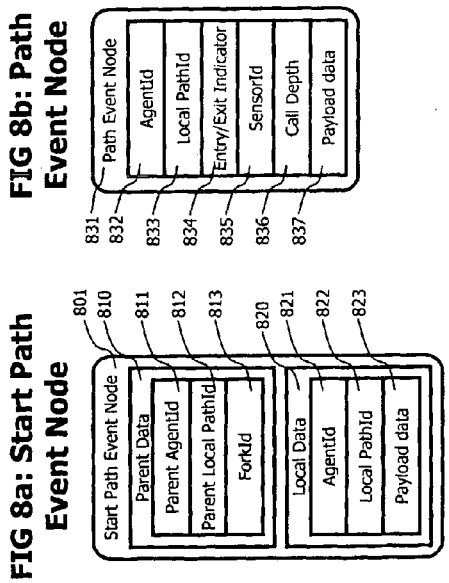
FIG 8: Event Nodes

FIG 9: Transfer of Correlation Information between Threads Boundaries
FIG 9a: Parent Thread
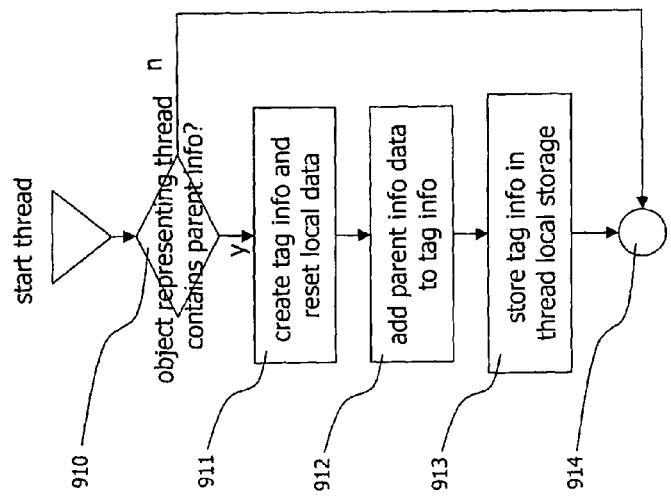
FIG 9b: Child Thread
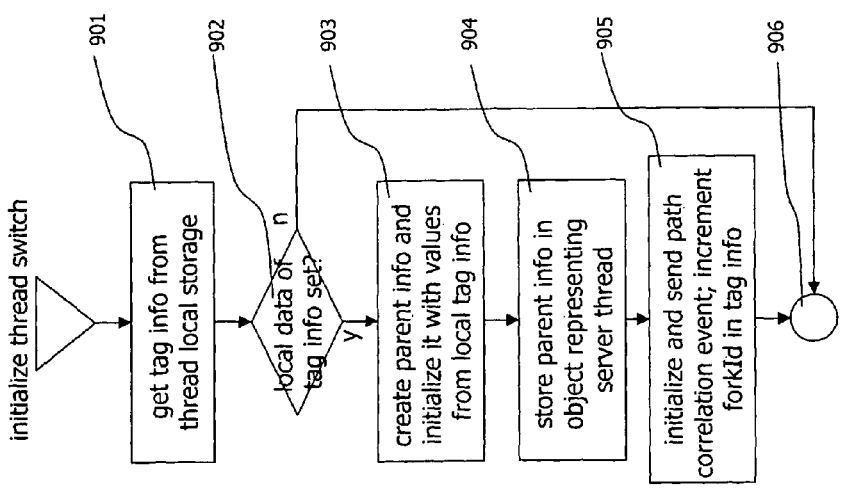

FIG 10: Transfer of Correlation Information within Remote Method Calls { Fig 10a, Fig 10b }
FIG 10b: Remote Message Callee
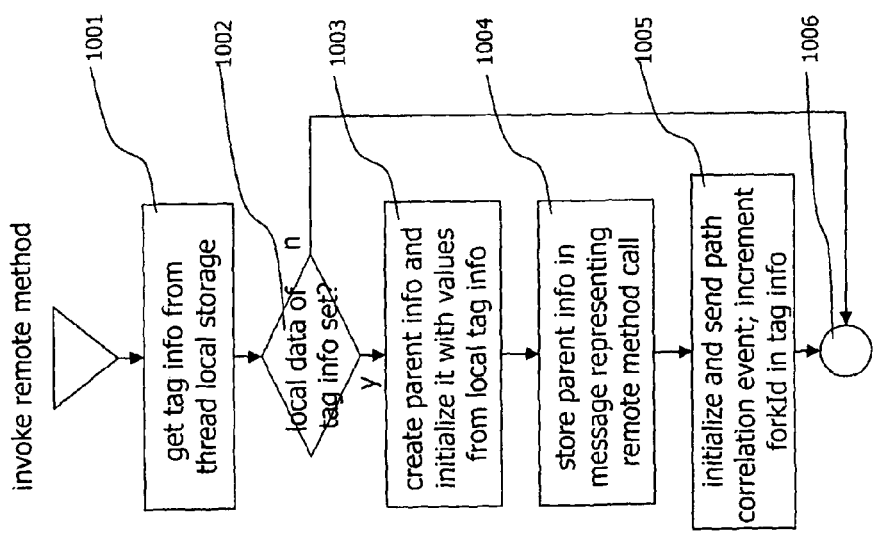
FIG 10a: Remote Message Caller
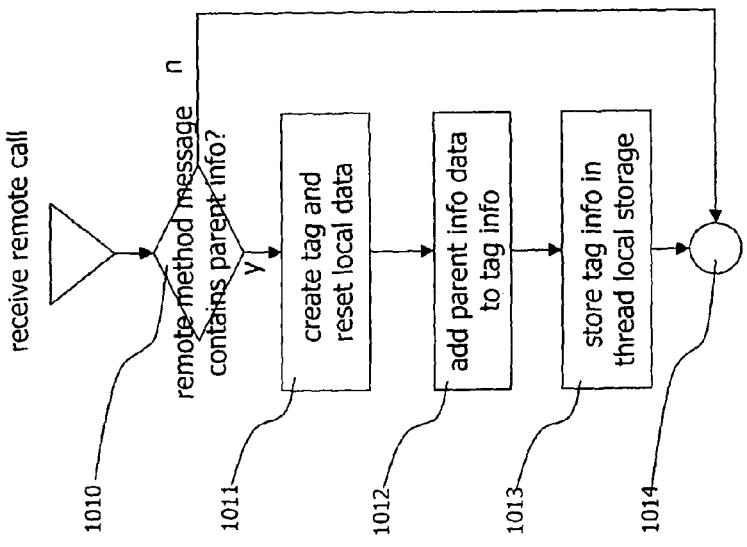

FIG 11: Transfer of Correlation Information within Messages { Fig 11a, Fig 11b
FIG 11b: Message Receiver
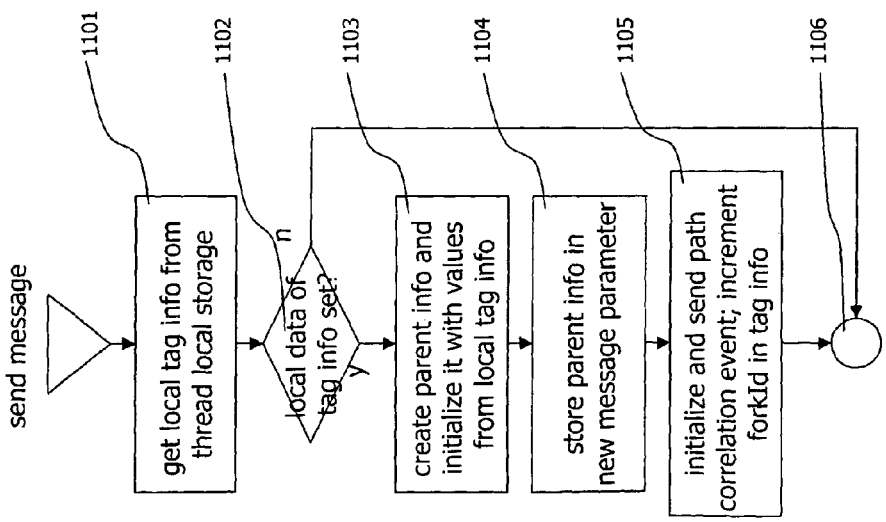
FIG 11a: Message Sender
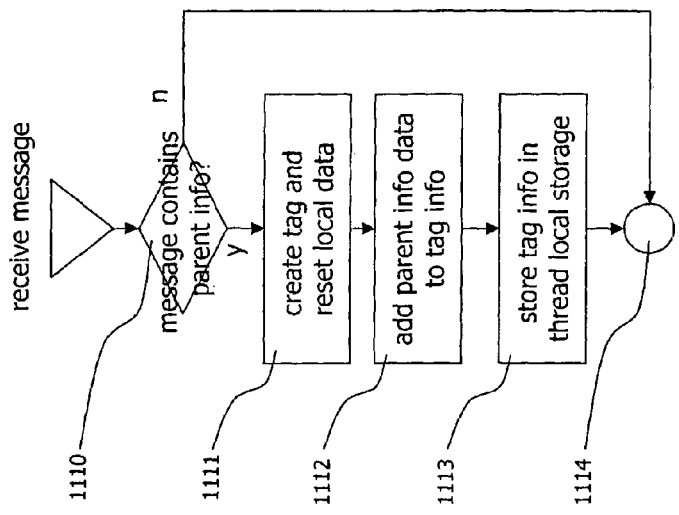

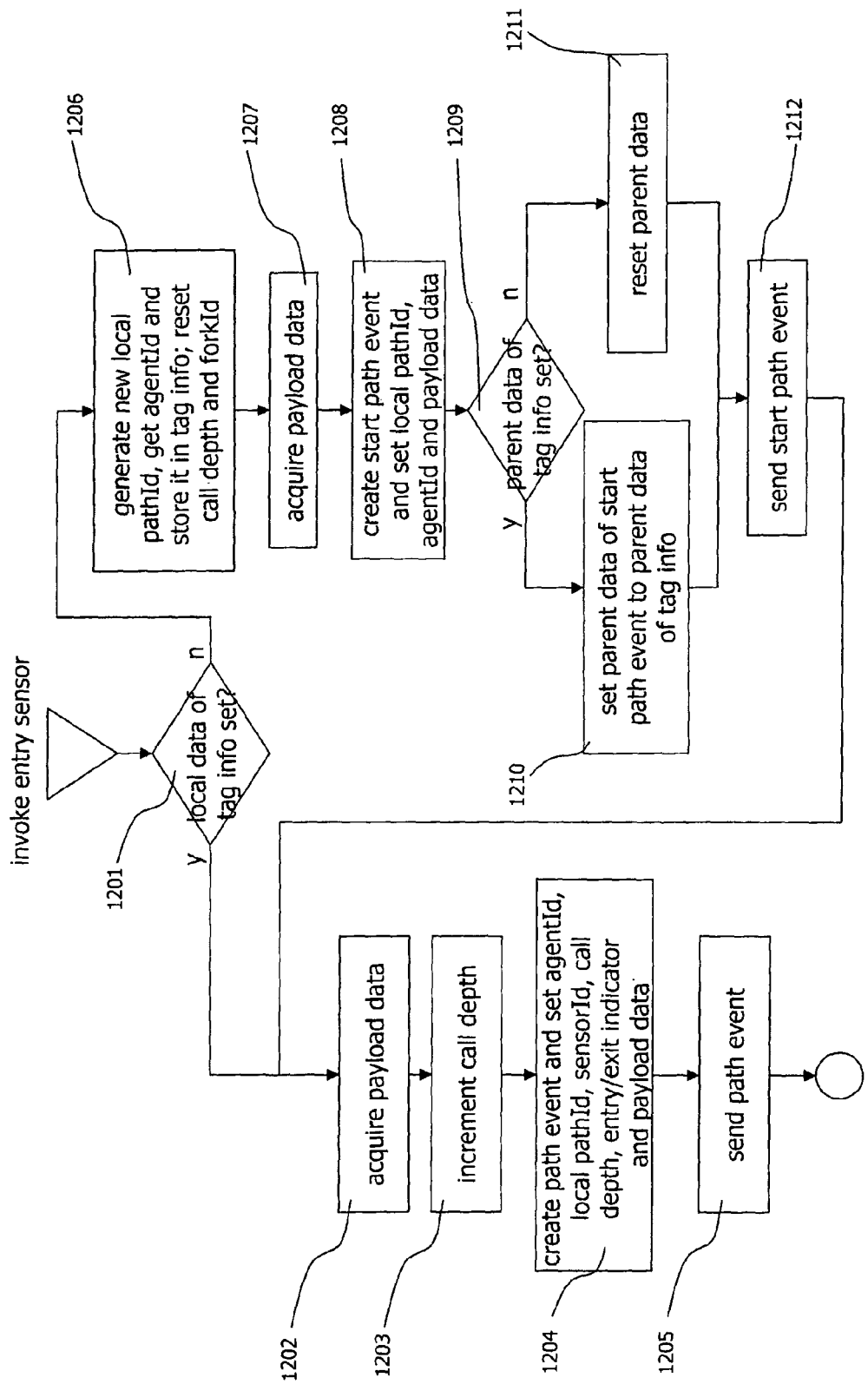

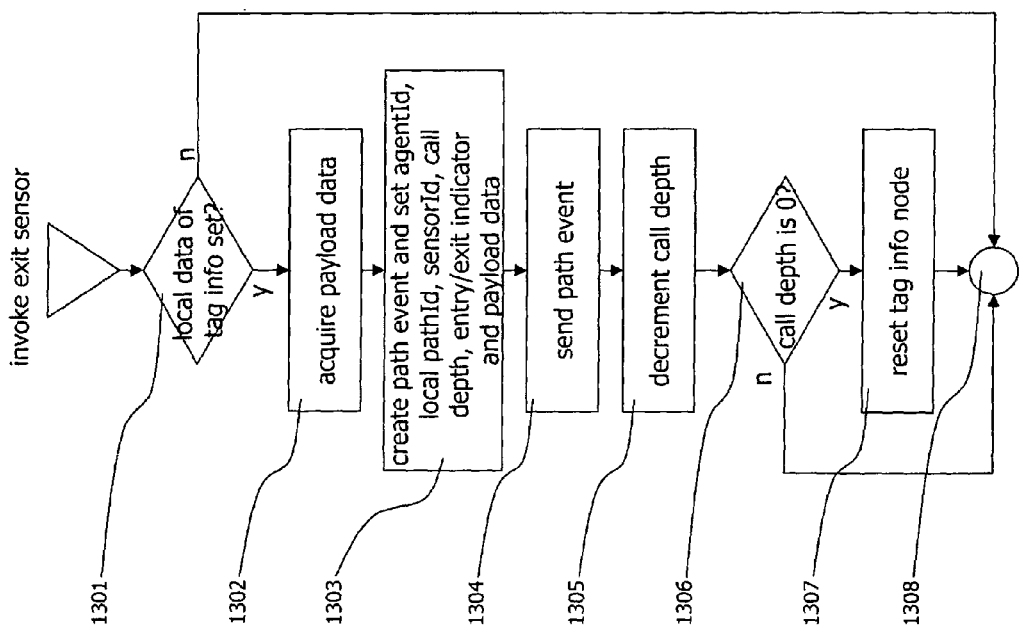
FIG 13: Exit Instrumented Method

FIG 14: Path Nodes { Fig 15a, Fig 15b, Fig 15c, Fig 15d, Fig 15e, Fig 15f

FIG 14a: Start Path Node

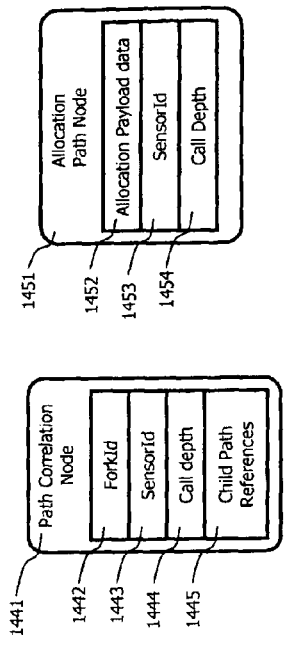

- 1401 Start Path Node
- 1410 Parent Path Info
- 1411 Parent PathId
- 1412 Parent AgentId
- 1413 ForkId
- 1420 Path Info
- 1421 PathId
- 1422 AgentId
- 1423 Payload data
- 1424 Path Nodes
- 1425 Temporary Correlation Nodes

FIG 14b: Path Node

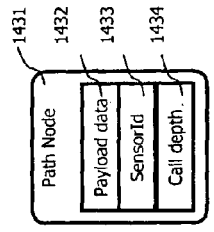

- 1431 Path Node
- 1432 Payload data
- 1433 SensorId
- 1434 Call depth

FIG 14c: Path Correlation Node

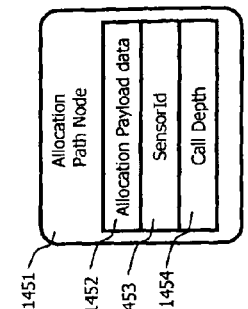

- 1441 Path Correlation Node
- 1442 ForkId
- 1443 SensorId
- 1444 Call depth
- 1445 Child Path References

FIG 14d: Allocation Path Node

- 1451 Allocation Path Node
- 1452 Allocation Payload data
- 1453 SensorId
- 1454 Call Depth

FIG 14e: Synchronization Path Node

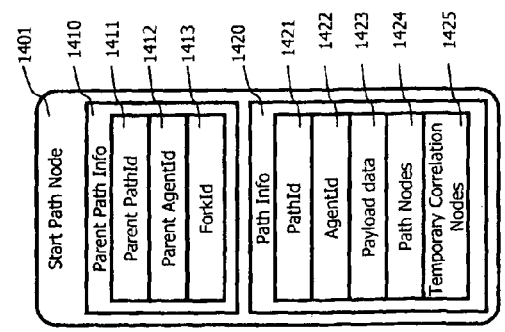

- 1461 Allocation Path Node
- 1462 Synchronization Payload data
- 1463 SensorId
- 1464 Call Depth

FIG 14f: Runtime Suspension Path Node

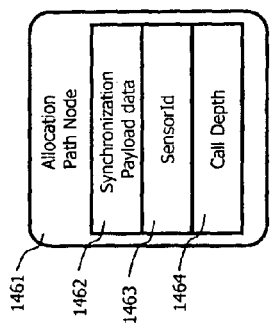

- 1471 Runtime Suspension Path Node
- 1472 Runtime Suspension Payload data
- 1473 SensorId
- 1474 Call Depth

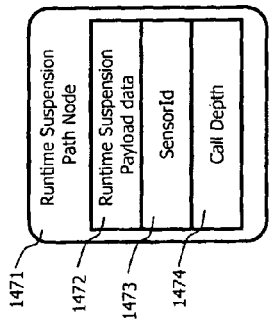

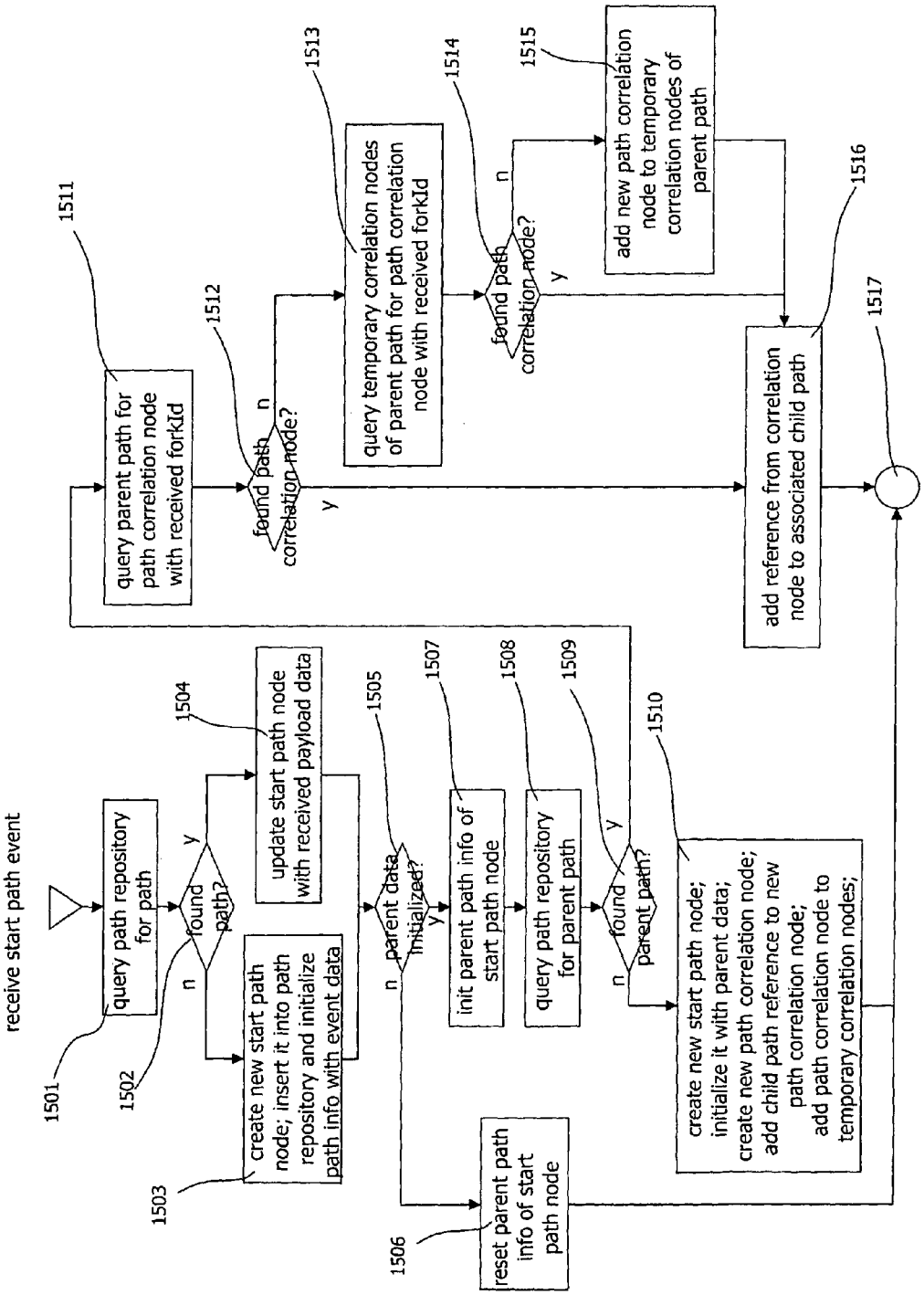

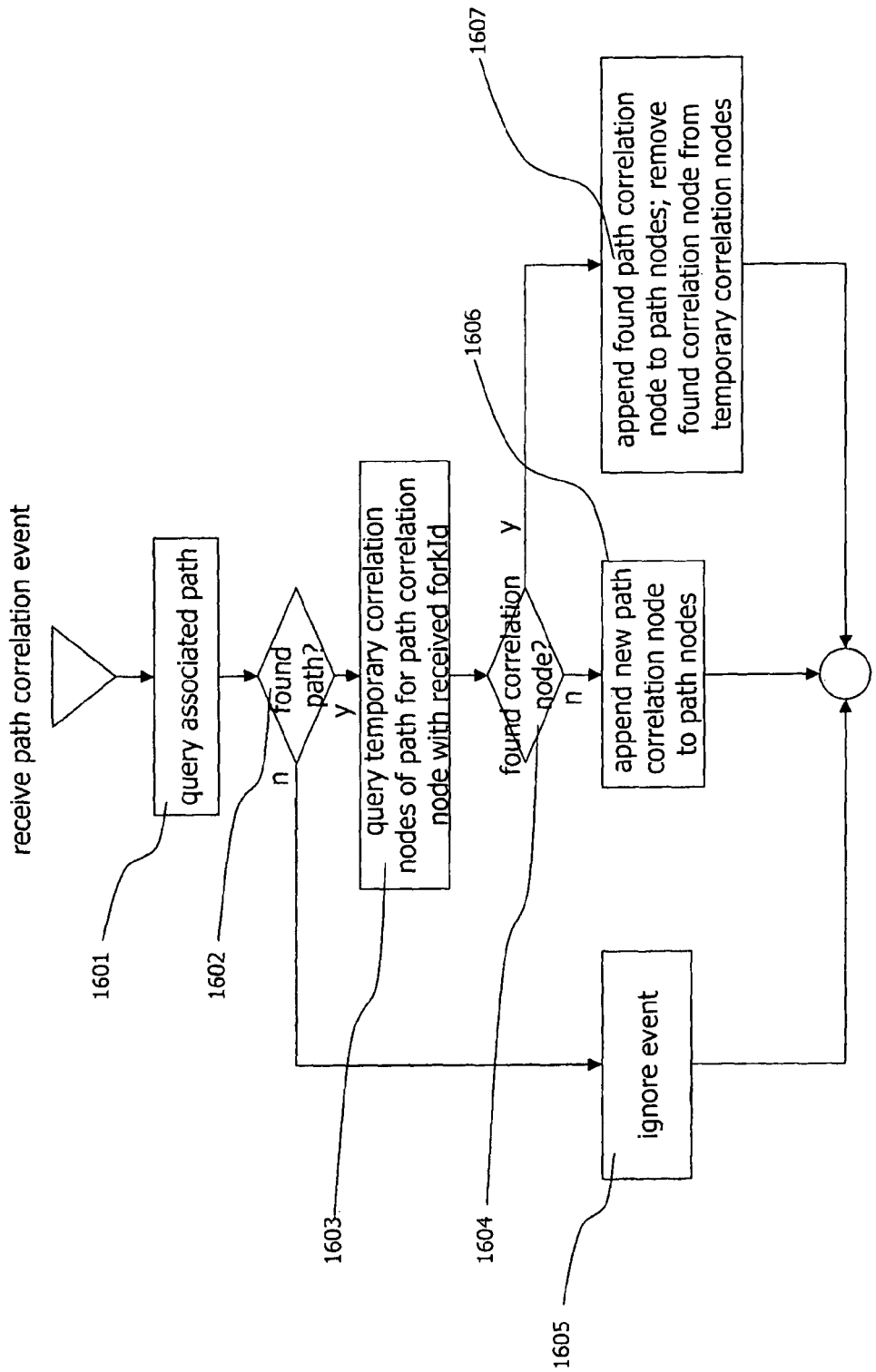
FIG 16: Correlation of Path Correlation Events

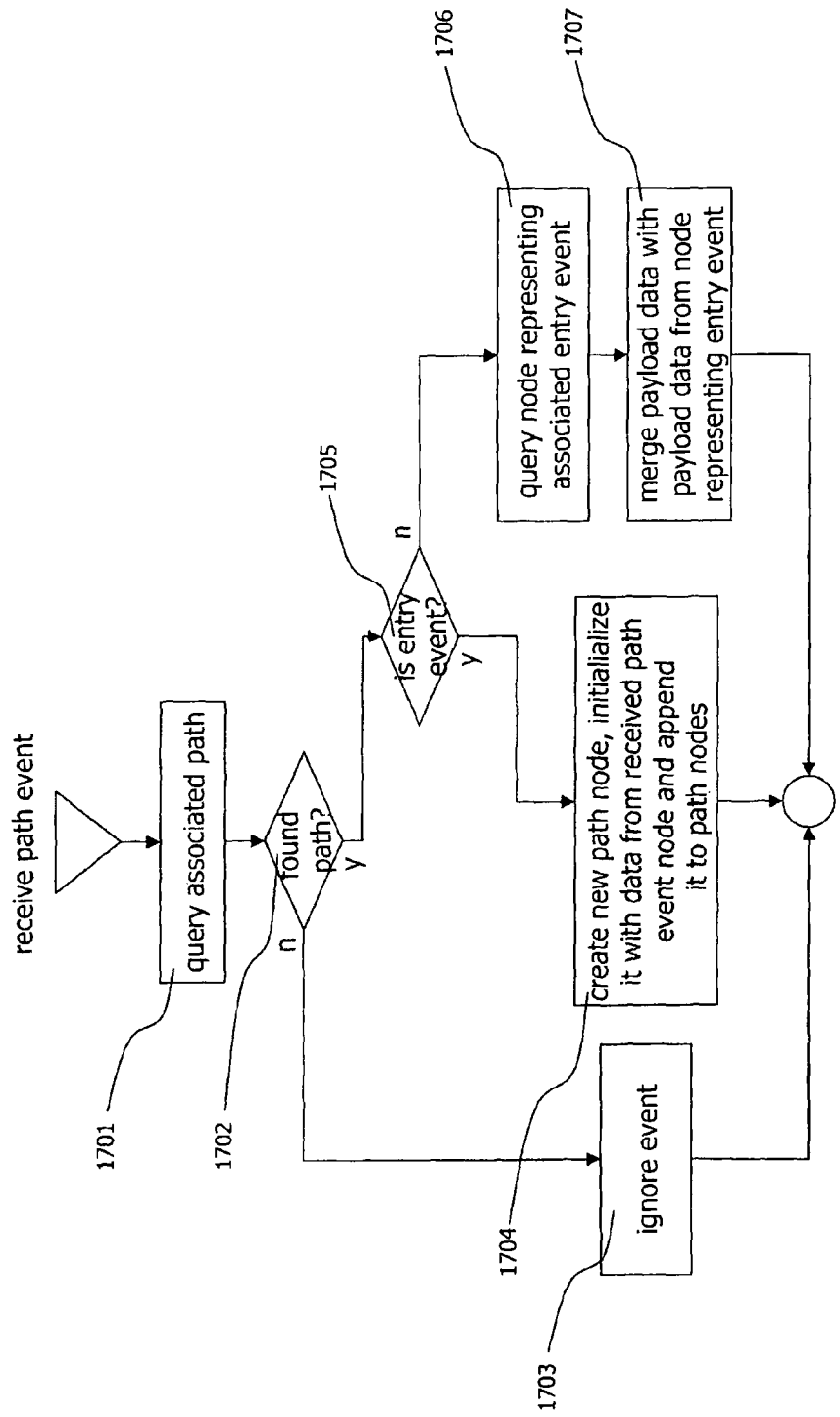

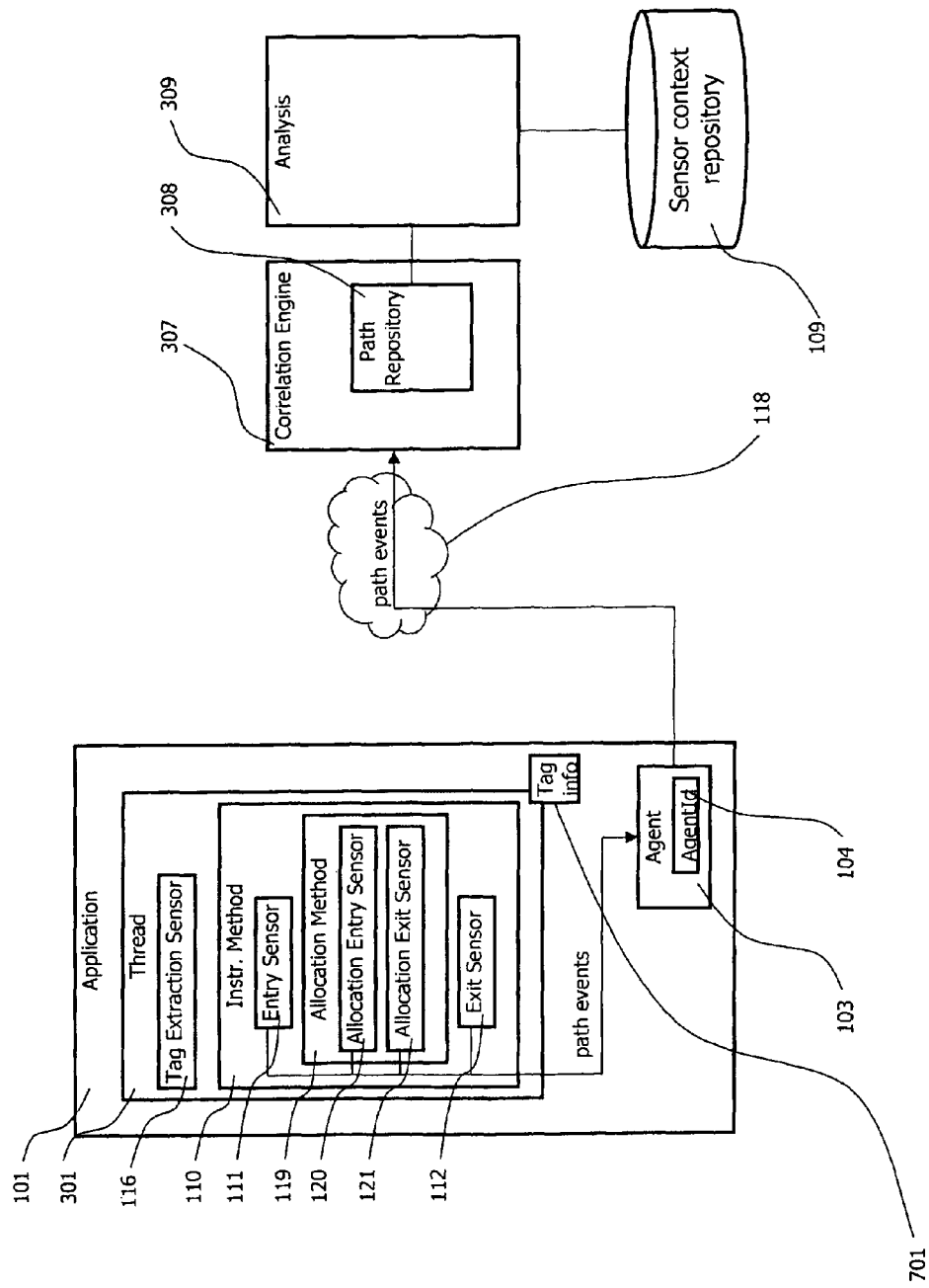
FIG 18: Tracing Object Allocations

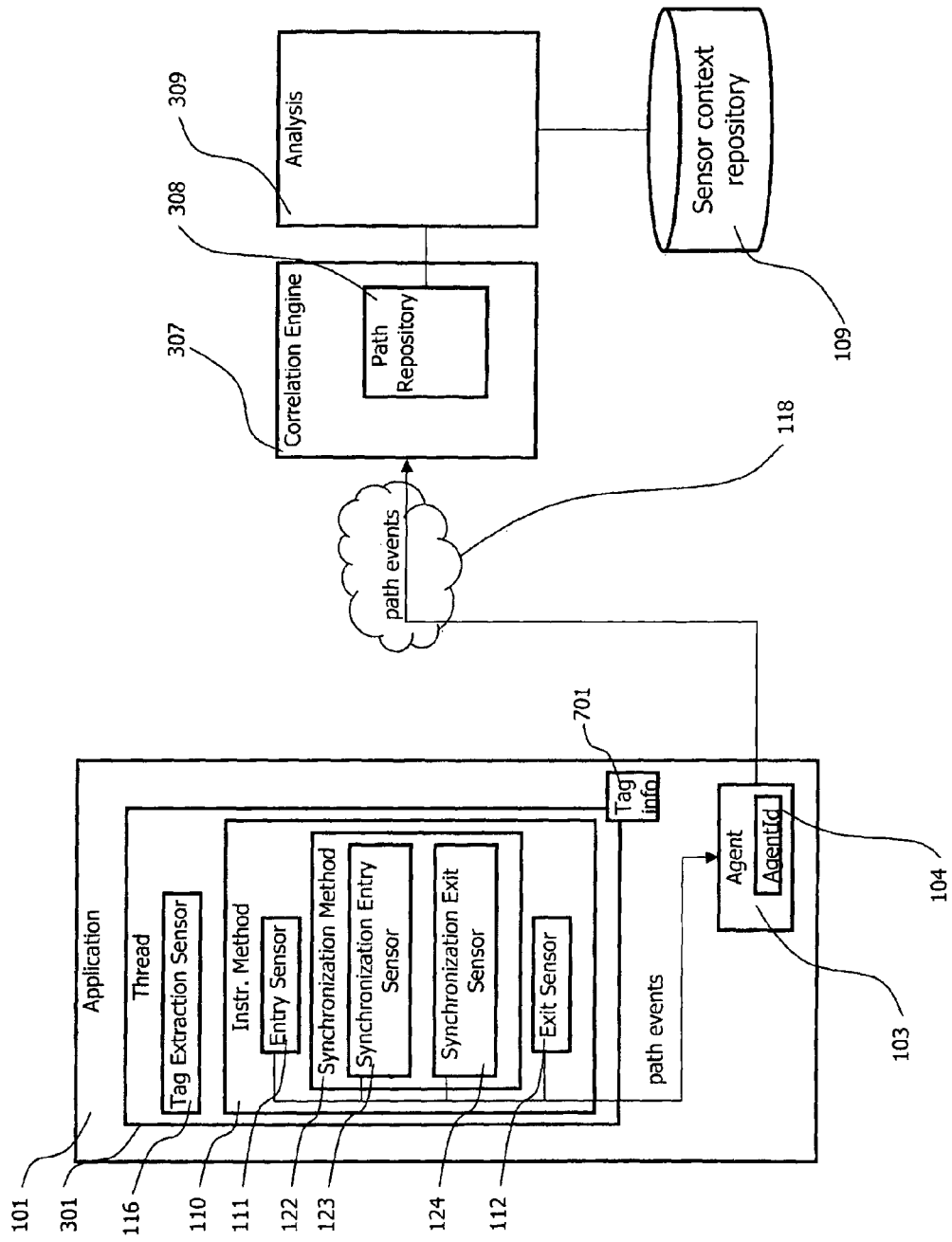

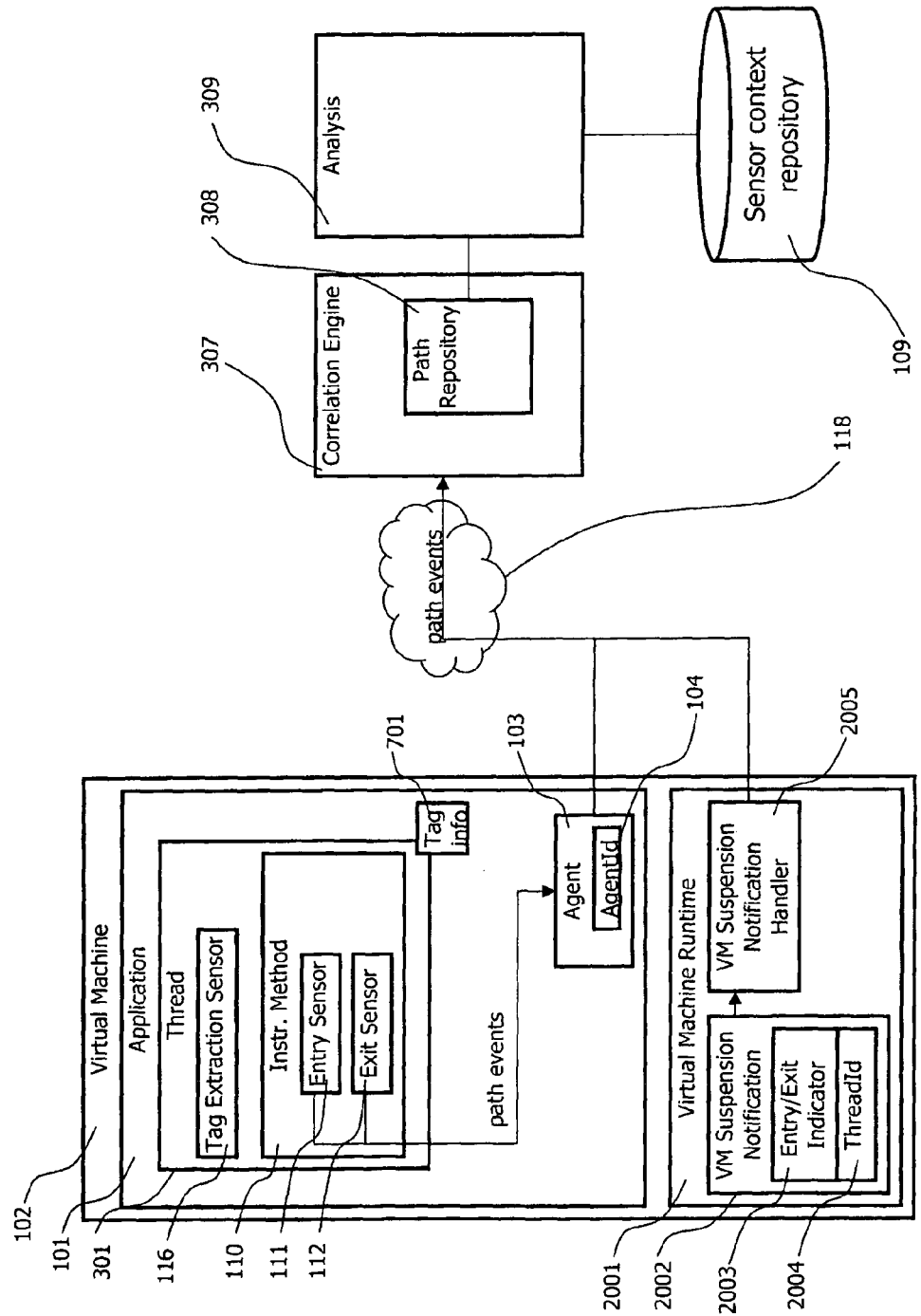

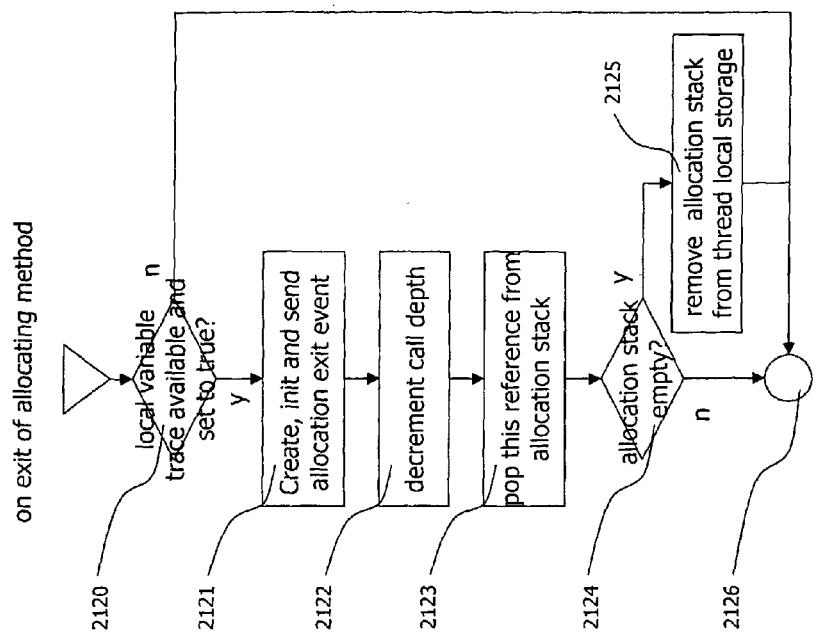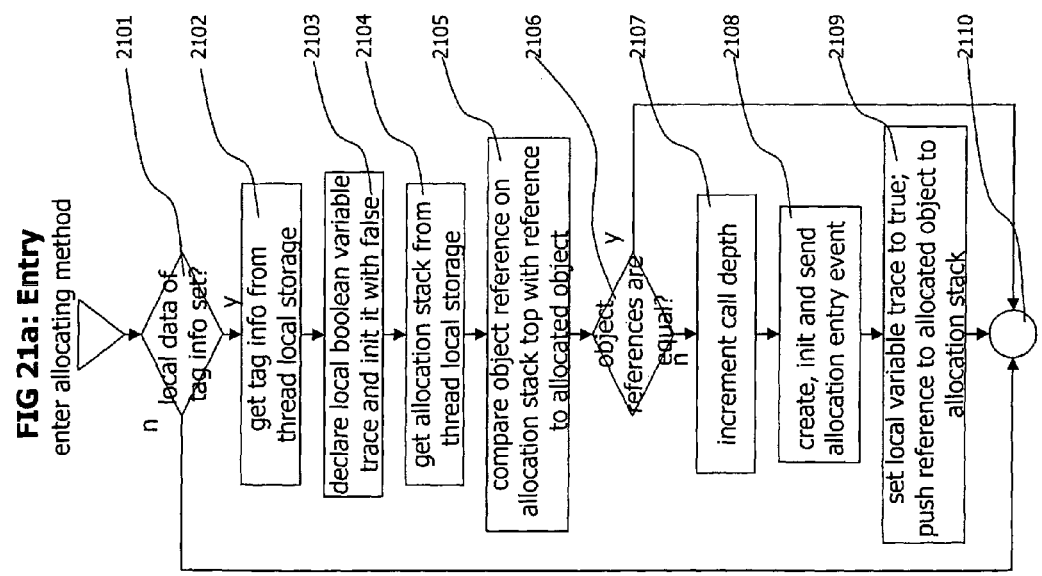

FIG 22: Execution of Synchronization Sensor {FIG 22a, FIG 22b}
FIG 22a: Entry
enter synchronization method
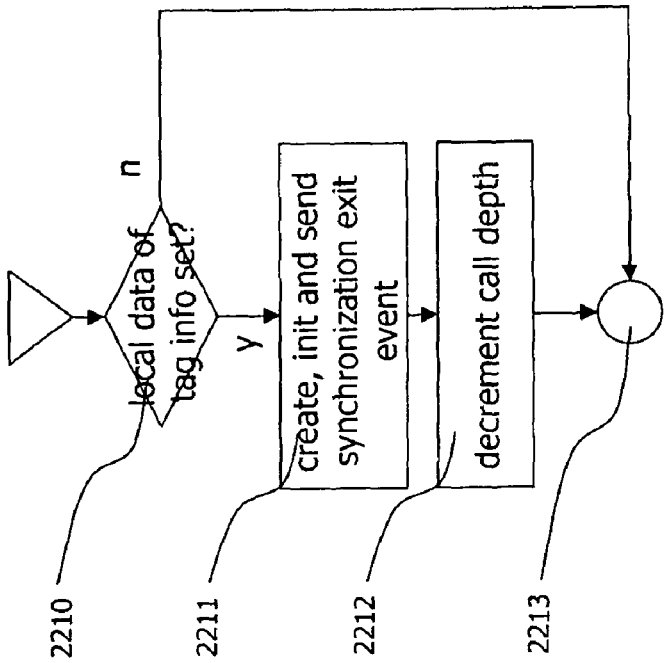
FIG 22b: Entry
on exit of synchronization method
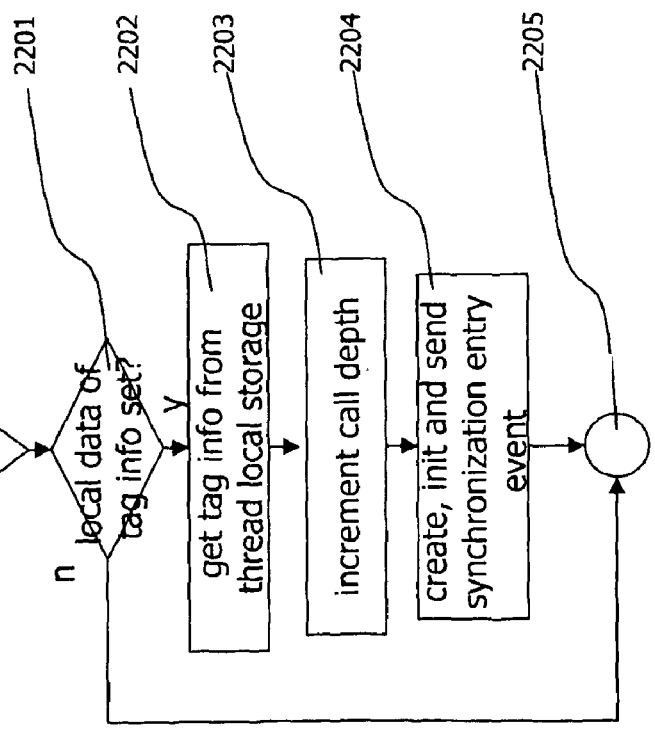

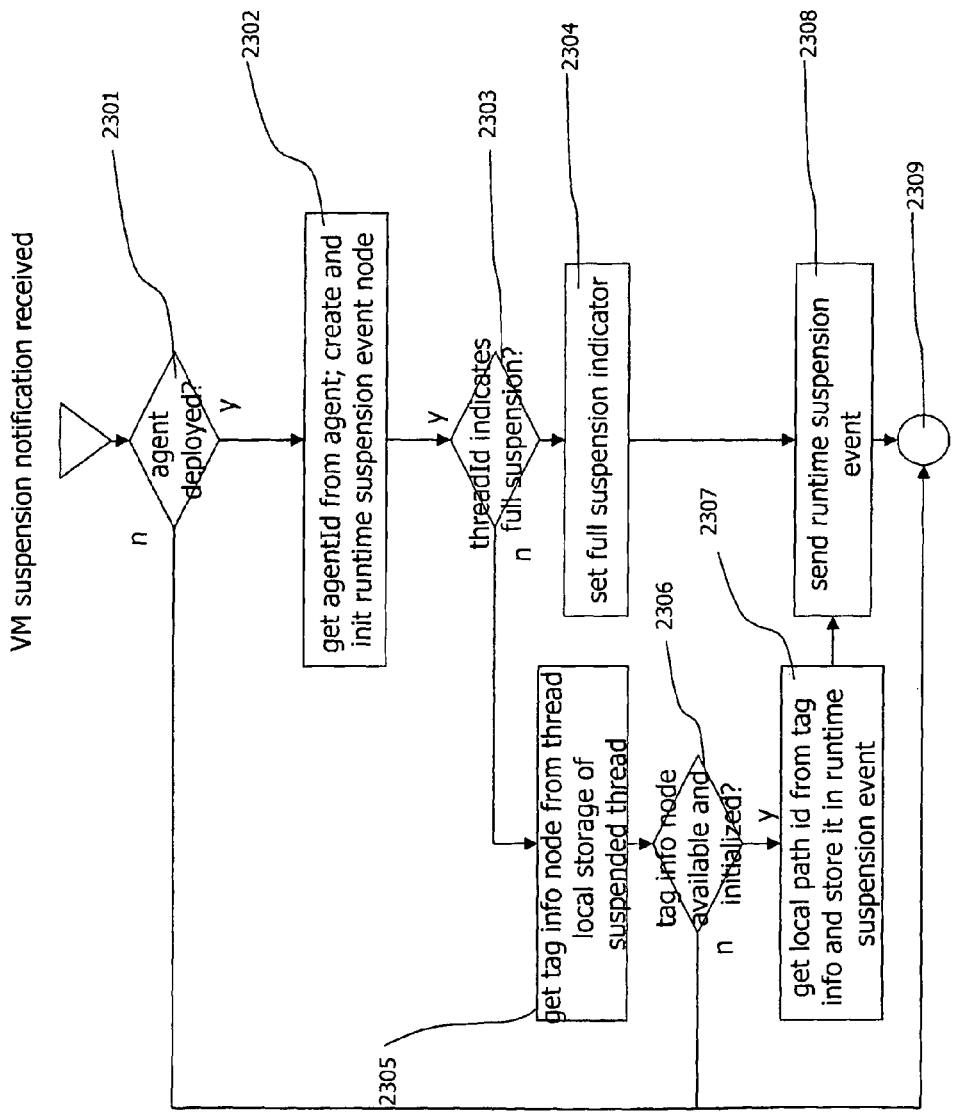
FIG 23: Handing VM Runtime Suspension Notifications

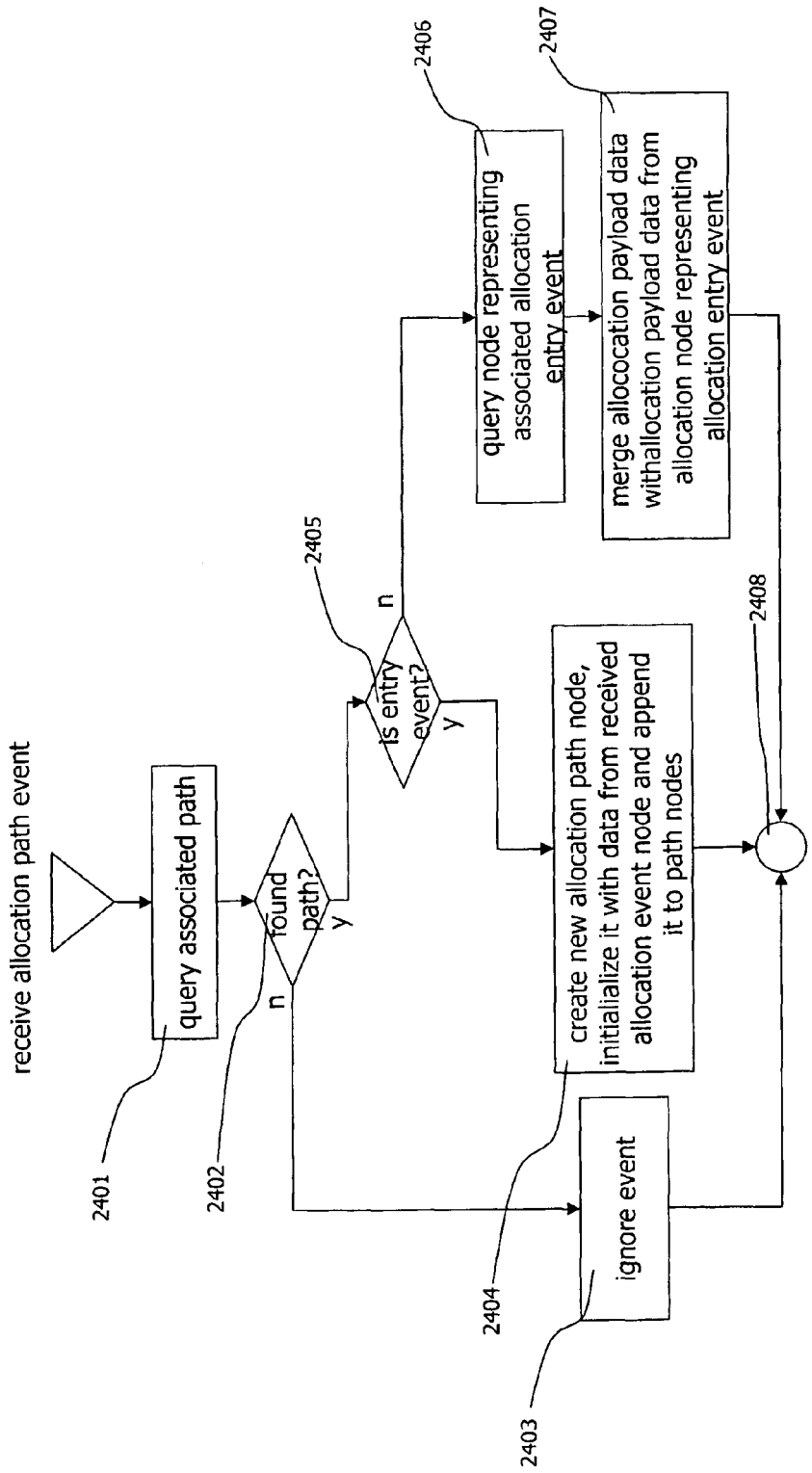

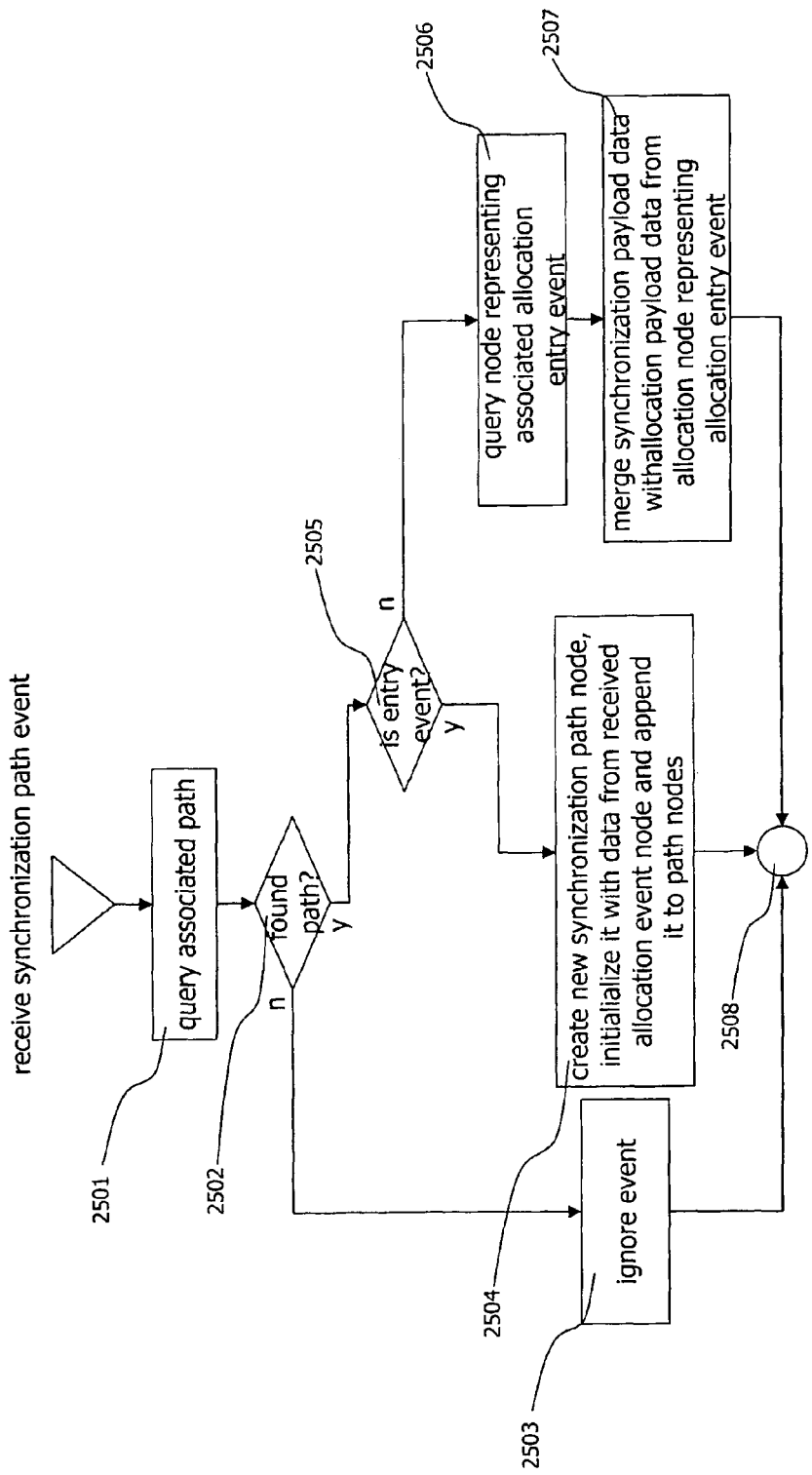
FIG 25: Correlation of Synchronization Events

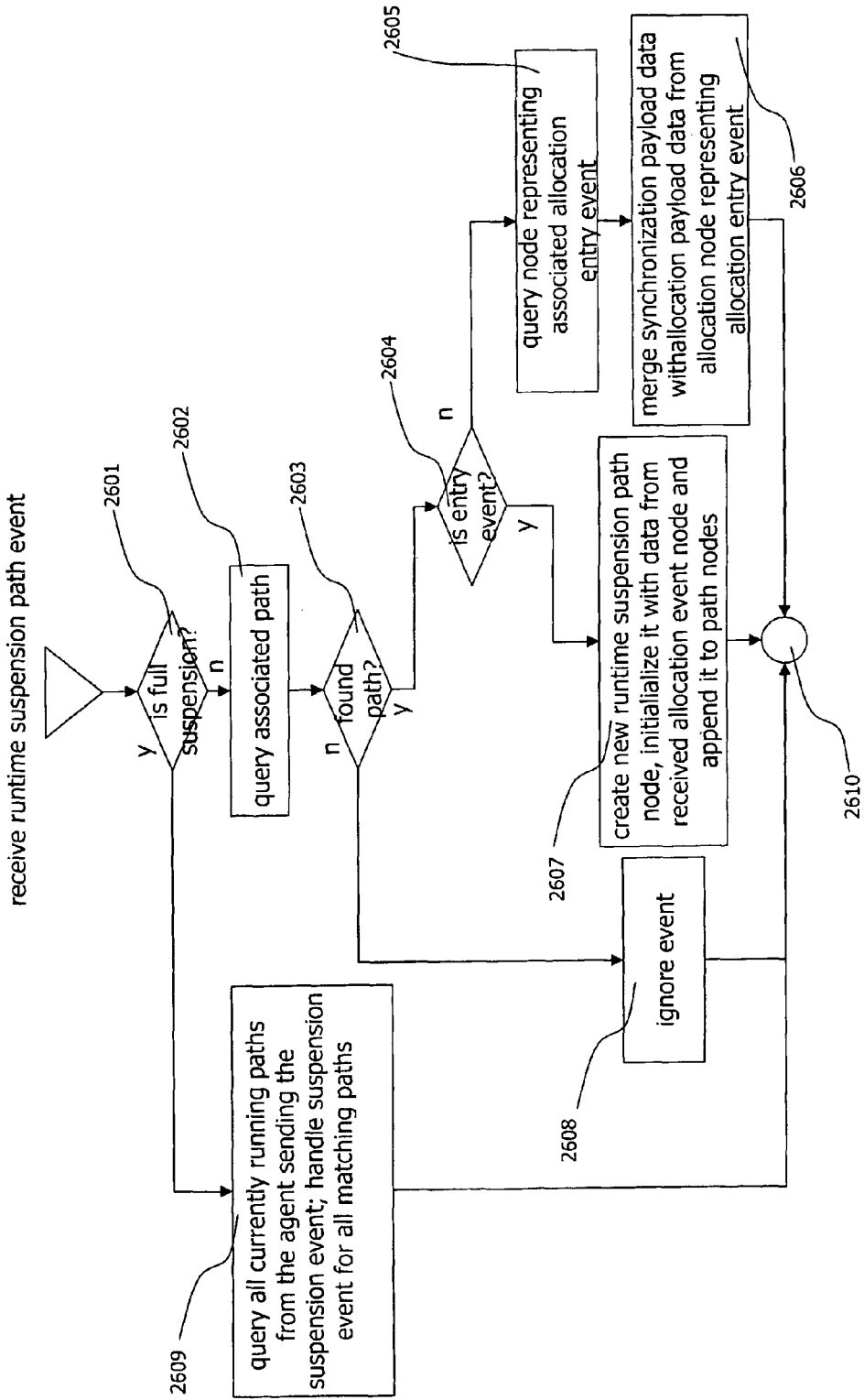
FIG 26: Correlation of Runtime Suspension Events

METHOD AND SYSTEM FOR TRACING INDIVIDUAL TRANSACTIONS AT THE GRANULARITY LEVEL OF METHOD CALLS THROUGHOUT DISTRIBUTED HETEROGENEOUS APPLICATIONS WITHOUT SOURCE CODE MODIFICATIONS

PRIORITY

The present invention claims priority under 35 USC section 119 based on the provisional filed on Aug. 14, 2007 with a Ser. No. of 60/955,654.

FIELD OF THE INVENTION

The present invention relates to tracing and monitoring of individual transactions performed by software applications. More particularly it relates to tracing the transactions over thread and process boundaries and allows the correlation of the parts of distributed transactions to one consistent end-to-end transaction. BACKGROUND OF THE INVENTION Object oriented and bytecode based software development platforms, including the SUN MICROSYSTEMS® JAVA™ platform and the MICROSOFT®.NET platform, have gained wide acceptance for developing Internet and Enterprise class software applications. Bytecode based software provides cross-platform and cross-language compatibility and eases the networked integration of software applications.

Remote method invocation available for the platforms, like SUN MICROSYSTEMS® Remote Method Invocation (RMI) and the MICROSOFT®.NET Remoting system, and messaging services like the SUN MICROSYSTEMS® JAVA™ Messaging Service (JMS) or the MICROSOFT® Messaging Queue ease the creation of distributed and loosely coupled architectures.

Approaches like service oriented architecture (SOA) use this features to provide flexible application architectures which can be adapted to rapidly changing market demands.

Albeit, this flexibility eases building and updating the functionality of applications, it constitutes a challenge for conventional performance monitoring and tracing tools which traditionally consider the scope of an isolated application. Most existing tools are not prepared to trace transactions over the borders of threads or different virtual machines.

Following the execution path of a transaction over the borders of threads, processes or different host systems is essential for tracing complete end-to-end transactions, which may be processed by a chain of different application servers that may communicate in various ways.

Information that depicts the different processing stages on different application servers and provides specific performance information for the processing stages is a precondition for performance analysis of distributed applications. To provide such information, it is required to correlate isolated trace information acquired from the different servers participating in a transaction, to depict a consistent end-to-end transaction.

DESCRIPTION OF RELATED ART

There are some systems available that provide mechanisms for tracing distributed transactions, but those systems either depend on specific properties of the monitored system, like e.g. synchronized clocks of servers involved in distributed transactions or generate insufficient correlation information. The generated correlation information is sufficient to reconstruct parent-child relationships between parts of distributed transaction executed on different servers, but they fail to reconstruct the exact sequence in which child parts of the transactions were activated. Other systems only provide post-mortem analysis of transactions, or are not able to analyze blocked or stalled transactions.

Some of the existing monitoring systems have memory requirements which are depending on the nesting depth of executed methods, which makes a prediction of the memory overhead caused by the monitoring system impossible, and which may cause a crash of the monitored system in case of deep nested method executions which may e.g. occur in recursive methods.

JaViz[2], is a monitoring system developed by IBM which allows tracing of distributed transactions running on JAVA™ platforms, using the SUN MICROSYSTEMS® RMI framework for communication. The system amends the used virtual machines in a way that they generate tracing data for each executed method, which is written to trace files. The trace files contain statistical information about local method calls, outbound remote method calls and inbound remote method service requests. The trace files also contain correlation data which enables to match outbound remote method calls invoked on one virtual machine with the corresponding inbound remote method service request received on another virtual machine. After a distributed transaction is terminated, a merging tool is executed, which evaluates the correlation data stored in the trace files generated by the involved virtual machines. The merging tool generates an overall trace file which describes the whole distributed transaction. The so generated trace file is interpreted by a visualization tool which provides a tree-like view of the transaction. Although JaViz provides useful information for analyzing distributed transactions, the restriction to post-mortem analysis and the relatively complex handling of the different trace files exclude this approach from usage in production environments.

The Application Response Measurement framework (ARM) [2], a standard for monitoring application performance, created by Hewlett-Packard and Tivoli WebSites, provides infrastructure for real-time monitoring of distributed transactions. To trace transactions with ARM, calls to ARM methods are inserted at the entry points and all exit points of methods which should be monitored. This requires access to the source code of the application which should be monitored and the ability to rebuild the application after ARM monitoring is included. Accessing the application source is often difficult or even impossible. Additionally the requirement to adapt application source code and rebuild the application to apply changes of the set of monitored methods makes this approach inflexible in terms of adapting the monitoring configuration.

The system described in [3] and [4] combines the ARM framework with bytecode instrumentation, and thus removes the requirement to adapt the application source code to install monitoring code. The described system creates a stack data structure at the thread local storage which maps the current method call stack. The stack data structure is used to correlate method calls to the method execution sequence performed in the local thread. Memory consumption of the stack data structure grows proportional to the nesting depth of the instrumented methods and can become a severe problem if the level of the nesting becomes high or unpredictable, as it is e.g. possible in recursive method calls. The system places instrumentation code at entries and exits of monitored methods. Entry instrumentations create and initialize a record for storing performance data, and exit instrumentations update the record and send it to an instance which analyzes and visualizes the record. This approach keeps network traffic low because only one data record is sent for each monitored method call, but it causes problems in handling blocked or stalled transactions. In case of a blocked or stalled transaction, in the worst case no method is exited and thus no monitoring data of the blocked transaction is generated. If a monitored method activates another thread, either via explicit thread switch, or by invoking a remote method, the system generates correlation information which identifies the activating method, the thread that executes it and the server which is hosting the virtual machine. The correlation information is transferred to the activated thread and allows correlating the activated thread with the activating instrumented method, but in case of multiple thread activations performed by one monitored method, the provided correlation information is not sufficient to reconstruct the sequence of the multiple thread activations. Knowing the sequence of the activations would be very useful to analyze problems caused by race conditions between the activated threads.

The system described in [5] provides tracing mechanisms which can be dynamically enabled and disabled. The system uses bytecode instrumentation to place entry interceptors and internal interceptors in the monitored application. If a transaction invokes an entry interceptor, the entry interceptor first evaluates a set of rules to decide if the transaction should be traced and initiates tracing according to the result of the rule evaluation. An interceptor consists of monitoring code placed at the entry and at each exit of instrumented methods. Interceptors produce and send measurement data when executing the code placed at method exits. This leads to problems with blocked transactions, as described before. The system allows tracing transactions which span multiple servers, but it uses timestamp information for correlation, and thus requires synchronized clocks at the involved servers, which is a requirement that is often hard to fulfill.

The system described in [6] also aims to trace distributed transactions, but as the approaches discussed before, it does not address blocked transactions. Additionally, it uses timestamp data for correlation and thus requires synchronized clocks.

Consequently, there is a need for a monitoring system that allows tracing of distributed end-to-end transactions, which overcomes the shortcomings of currently existing approaches.

Additionally, visibility of resources used by the transaction is required, like e.g. heap memory allocations for creation of new objects, performed during transaction execution, or time spent to synchronize with other, concurrent transactions.

Another important missing feature is the ability to distinguish time the transaction actually spent executing, and time the transaction was suspended due to execution maintenance tasks of the underlying virtual machine, like running garbage collector or re-compiling byte-code.

REFERENCES

[1] Kazi et al., "JaViz: A client/server Java profiling tool", IBM SYSTEMS JOURNAL, VOL 39, NO 1, 2000

[2] "Monitoring and Diagnosing Applications with ARM 4.0", http://www.opengroup.org/tech/management/arm, 2004

[3] Rees et al., "Synthesizing Application Response Measurement (ARM) Instrumentation, Hewlett-Packard, US2005/0039172 A1

[4] Avakian et al., "Using Interceptors and Out-of-Band Data to monitor the Performance of Java 2 Enterprise Edition (J2EE) Applications", Hewlett-Packard, US2005/0039171 A1

[5] Fung et al., "Method for Tracing Application Execution Path in a Distributed Data Processing System", Poon Fung, Cupertino, Calif. (US), US2007/7194664 B1

[6] Maccabee et al., "Application End-to-End Response Time Measurement and Decomposition", International Business Machines Corporation, US2000/6108700

SUMMARY OF THE INVENTION

A method for tracing distributed transactions over thread, process and server boundaries may include steps of placing an entry sensor at a beginning of an instrumented method of the distributed transactions and placing an exit sensor at an exit point of the instrumented method of the distributed transactions;

The entry sensor or the exit sensor may use a thread local storage to store and retrieve correlation information to correlate method invocations for the thread, and the entry sensor may provide correlation information to correlate method invocations for the thread prior to the completion of the method invocations.

The correlation information may be stored and retrieved in cooperation with constant memory consumption to avoid exceeding an upper limit of the constant memory, and the constant memory consumption may be achieved independent of call depth of the thread.

The entry sensor and the exit sensor may provide information to locate a stalled transaction, and the transaction may include a parent transaction and multiple child transactions of the parent transaction; the correlation information may include the sequence of child transactions.

The correlation information may be at a granularity level of the method invocations, and the distributed transactions may be within a monitored application and the correlation information may be converted to performance metrics outside of the monitored application.

A system for tracing distributed transactions over thread, process and server boundaries may include an entry sensor positioned at a beginning of an instrumented method of the distributed transactions, an exit sensor positioned at an exit point of the instrumented method of the distributed transactions. The entry sensor or the exit sensor may use a thread local storage to store and retrieve correlation information to correlate method invocations for the thread.

BRIEF DESCRIPTION OF THE DRAWINGS

The invention may be understood by reference to the following description taken in conjunction with the accompanying drawings, in which, like reference numerals identify like elements, and in which:

FIG. 1: conceptually depicts the process of instrumenting selected methods of monitored applications with sensors, and shows extraction and storage of sensor context information.

FIG. 2: shows a sensor context node which may be used to store contextual information concerning a specific instrumented sensor.

FIG. 3: illustrates a portion of a monitored transaction where one thread activates another thread running within the same virtual machine. The transfer of correlation information between threads and sending of path events is shown.

FIG. 4: depicts a portion of a monitored transaction where one thread invokes a remote method, which may be executed by a different virtual machine, running on different host systems, connected by a computer network. It also shows the transfer of correlation information within the network message representing the remote method invocation.

FIG. 5: depicts a monitored transaction that sends a message using a dedicated messaging infrastructure like a messaging server to one or more recipients, including the transfer of correlation information within the sent message. If the message is multiplied and sent to multiple recipients, also the attached correlation information is multiplied.

FIG. 6: conceptually shows a parent information data structure which may be used to transfer correlation information between different threads. The threads may run in different virtual machines, which may in turn run on different hosts, which are connected by a computer network.

FIG. 7: depicts a tag information data structure which may be used to store information to correlate a chain of distinct method calls within one thread.

FIG. 8: shows different forms of event nodes which are used to notify the correlation engine about events that occurred within monitored applications. More specific, it conceptually depicts a start path event node, which may be used to indicate the start of a transaction, a path event node which may indicate the entry or exit of a monitored method, a path correlation node, which may be used to indicate a thread switch within a monitored transaction, an allocation event node which may indicate heap memory allocation for creation of new objects performed during transaction execution, a synchronization event node, which may be used to indicate time spent to synchronize the transaction with other concurrent transactions and a runtime suspension event node, which may be used to indicate runtime suspensions that occurred during execution of the transaction.

FIG. 9: describes the process of transferring correlation information between two different threads, being part of a monitored transaction.

FIG. 9a conceptually shows the actions performed within the thread that initiates the thread switch.

FIG. 9b shows the process of extracting the transferred correlation information in the activated thread;

FIG. 10: shows the transfer of correlation information between a client thread that invokes a remote method and a server thread that executes the invoked method. Both threads may be executed on different host systems which are connected by a computer network.

FIG. 10a shows the transfer of correlation information to the network message representing the remote method invocation.

FIG. 10b depicts how the correlation information is transferred to the local storage of the thread serving the remote method call.

FIG. 11: depicts the process of transferring correlation information within messages sent via dedicated messaging services, like messaging server.

FIG. 11a shows how the sending thread adds correlation information to a message before it is sent;

FIG. 11b depicts the extraction of the correlation information by the thread that receives the message.

FIG. 12: conceptually depicts the execution of a method entry sensor. The entry sensor first checks if the tag info node stored in the thread local storage indicates if a parent thread is assigned to the current thread and if the current entry sensor invocation is the first within the current thread and sends path events nodes accordingly.

FIG. 13: shows the execution of a method exit sensor. The exit sensor first checks if the tag info node stored in the thread local storage indicates that at least one entry sensor was executed within the current thread. In this case, an event indicating a method exit is sent.

FIG. 14: depicts data structures of path nodes correlation nodes which may be used to represent parts of individual transaction. More specific, it depicts a start path node, which represents a part of a transaction executed within one thread. A path node represents an individual execution of a method, and a path correlation node is used to link the parts of one transaction executed within different threads into a complete end-to-end transaction, spanning multiple threads, virtual machines or host machines. An allocation path node, which may represent heap memory allocations for creation of new objects performed during path execution, a synchronization path node which may indicate time spent to synchronize the transaction with other concurrent transactions and a runtime suspension path node which may represent suspensions of the underlying virtual machine which may have occurred during execution of the transaction.

FIG. 15: shows the processing of a received start path event by the correlation engine.

FIG. 16: shows the processing of a received path correlation event by the correlation engine.

FIG. 17: shows the processing of a received path event by the correlation engine.

FIG. 18: illustrates a portion of a monitored transaction where an allocation method, which performs memory allocations for creation of new objects is executed by an instrumented method.

FIG. 19: illustrates a portion of a monitored transaction where a synchronization method, which may perform synchronization with other, concurrent transactions, is executed by an instrumented method.

FIG. 20: exemplarily depicts runtime suspension notification mechanisms, as provided by debugging/monitoring interfaces of virtual machines, like the JVMTI interface provided by the SUN MICROSYSTEMS® JAVA™ Virtual Machine, and an event handler which transforms suspension notifications in appropriate path event nodes.

FIG. 21: shows the process of executing an allocation entry and an allocation exit sensor.

FIG. 22: describes the execution of the entry and exit parts of a synchronization sensor.

FIG. 23: illustrates the process of handling an incoming runtime suspension notification by the VM suspension notification handler.

FIG. 24: depicts the process of correlating allocation events to the execution path of a monitored transaction.

FIG. 25: illustrates the process of correlating synchronization events to the execution path of a monitored transaction.

FIG. 26: illustrates the process of correlating runtime suspension events to the execution path of one or a set of monitored transactions.

DETAILED DESCRIPTION

The present invention is directed to a system and method for tracing distributed transactions through heterogeneous application environments, without the requirement to modify application source code. The invention uses correlation information which identifies an individual transaction, and the involved servers executing the transaction. The correlation information is transferred to spawned child transactions. Measurement data generated by those child transactions is tagged with the correlation information to enable real-time correlation of distributed transactions at the granularity level of method invocations.

The present invention requires neither source code modifications of monitored source code nor access to the source code to instrument bytecode based software applications. The code of monitored applications is instrumented on the fly, at application run-time, during or after loading bytecode. Neither the deployment of additional libraries to the monitored applications, nor modification or exchange of existing application libraries is required.

The invention discloses a system and method that enables tracing of individual distributed transactions across thread, process or server boundaries at the granularity level of individual method invocations.

The disclosed system and method enables to trace individual transactions that span multiple processes or servers, using remote method invocation frameworks for communication. Additionally, it enables tracing of individual transactions using messaging services for communication, taking also possible multiple message receivers into account.

The disclosed system and method stores correlation information required to correlate method invocations and parts of a distributed transaction in a way that memory required for storing the correlation information is independent of nesting level of method invocations or sub transactions. The constant memory requirement of the correlation information makes memory consumption caused by the monitoring tool more predictable and is especially useful for tracing transactions containing recursive method calls.

In case of blocked transactions, the present invention enables exact real-time determination of the method that caused the blocking of the transaction and the server at which the blocking method is executed.

The present invention allows exact correlation of local and remote sub transactions spawned by a transaction at method invocation level, including also the sequence of multiple sub transactions spawned during the execution of one instrumented method.

The present system and method provides correct tracing and monitoring data of distributed transactions if only a subset of the application servers involved in the execution of a transaction are instrumented. If one or more application servers within the execution chain of a transaction are not instrumented, correct tracing data is provided up to the first not instrumented server.

Present invention enables the reconstruction of the temporal sequence of method invocations being part of a distributed transaction which are executed on different servers, without the requirement of synchronized times at involved servers.

All calculations regarding acquired measurement data and correlation of parts of distributed transaction or method invocations are performed outside of the monitored applications to reduce monitoring caused overhead within the applications.

An agent is deployed to the monitored applications on startup, which monitors and intercepts loading of bytecode by the virtual machine. The agent captures the bytecode and sends it to a remote instrumentation server for instrumentation.

The instrumentation server extracts meta-data from the received bytecode, including, but not limited to the name of the class represented by the bytecode and names of the methods of the class. The instrumentation server determines, according to the extracted meta-data, which may also involve the evaluation of rule sets, which methods should be augmented with instrumentation bytecode. Instances of the instrumentation bytecode are further called sensors.

A sensor indicating the entry and a sensor indicating the exit of an instrumented method are placed, which are further called entry sensors and exit sensors. Entry sensors are placed at the beginning of an instrumented method and exit sensors are inserted at every exit point of an instrumented method.

Instrumented methods may be exited on a normal way, e.g. by the execution of a return statement, or through exception which occurred during method execution and which is not handled within the method. Both exit types are fundamentally different, are handled differently by different instrumentation code, like an enclosing try-catch block to capture exceptions, as known in the art. For the demonstration of the functionality of present invention, a distinction between the method exit types is not relevant and is thus omitted. The exit sensors of the exemplary embodiment described here are handling both kinds of method exits.

Entry and exit sensors use the storage of the local thread to store and retrieve information required to correlate separate method invocations within a single thread.

Additional sensors are placed in methods starting threads, initiating remote method calls or methods sending messages using messaging infrastructure like a messaging server. Those sensors are further called tagging sensors. Tagging sensors extract information required to identify a parent thread which e.g. starts another thread, invokes a remote method or sends a message. The extracted information is used to correlate measurement data from the parent thread with measurement data from dependent threads. The tagging sensors store the extracted information in a place which is accessible for both, the parent thread and the thread or threads invoked by the parent thread.

In case of a thread directly invoked by the parent thread, the extracted information is stored in an object representing the invoked thread. In a SUN MICROSYSTEMS® JAVA™ environment, the extracted correlation information is stored in an additional field to classes implementing the "java.lang.Runnable" interface which was inserted by the instrumentation engine via bytecode manipulation.

For remote method invocations, the tagging sensor stores the extracted correlation in an additional header field of the message representing the remote method invocation.

In case of a sent message, the tagging sensor adds a new parameter to the message and stores correlation information as value of the new parameter.

Although the implementation of tagging sensors for different target technologies, like local thread switches or remote method invocation differs, their basic functionality, consisting of the extraction of correlation information from a parent thread and storing it on a location which is accessible by a thread invoked by the parent thread, remains the same. As a differentiation of tagging sensors according to their addressed target technology is not relevant for the understanding of the present invention, such a differentiation is omitted and tagging sensors are referred to as tagging sensors, regardless of the addressed target technology.

Methods that directly or indirectly activate a thread are instrumented with a tag extraction sensor. Example for those methods are methods that process an incoming remote method invocation, methods that receive a message from a messaging server or a method that is invoked to execute a thread, like the e.g. method "run" of classes derived from the class "java.lang.Thread" for SUN MICROSYSTEMS® JAVA™ environments. The tag extraction sensors retrieve the correlation information stored by the associated tagging sensor and store it in the storage of the local thread to make it accessible for entry and exit sensors.

The implementation of tag extraction sensors also differs between different target technologies, but differentiation between those implementations is not relevant for the understanding of the invention. Thus, as for tagging sensors, different implementations of tag extraction sensors are not differentiated.

On the execution of an entry sensor, the sensor first determines if the current invocation is the first invocation of an entry sensor within current thread execution by using information retrieved from storage of current thread. If the current invocation is the first of an entry sensor within the thread, the sensor also checks if information of a parent transaction, as transferred and initialized by tagging sensors and tag extraction sensors is available in thread storage and sends an event indicating a new started transaction. The entry sensor updates the data in the thread storage to indicate that an invocation of an entry sensor has occurred. Indicators for call depth and the index of spawned child transactions, stored in the current thread storage are reset. Afterwards, an event node, indicating a new started transaction is initialized and sent to a remote correlation engine. The sent event node also contains the information to identify and correlate a parent transaction if information about the parent transaction is available in the thread local storage.

Additionally, measurement data is acquired and an event node indicating a method entry is initialized with the measurement data and sent to a remote correlation engine, and the call depth indicator is incremented.

On execution of an exit sensor, measurement data is acquired and stored in an event node indicating a method exit which is sent to a remote correlation engine. Finally the call depth indicator is decremented.

A remote correlation engine receives the events generated by entry and exit sensors and uses data extracted from the events to incrementally build data structures that reflect the execution of individual, distributed transactions. Concurrently to event correlation and building the data structure representing the transactions, an analysis module accesses the data structure to enable analysis and visualization of transaction in real-time, during the execution of the transactions.

Splitting and independently sending and correlation of method entry and exit events allow the analysis of transactions that block during execution and do not return. The received entry events allow the determination of the last method entered by the transaction, which is also the blocking method. This information is important to isolate and find the root cause for the block.

The described embodiment provides a system and method that allows tracing individual distributed end-to-end transactions. The execution of the traced transactions may involve multiple threads, virtual machines and host systems. The described embodiment allows tracing communication performed by the distributed transactions over multiple channels. The tracing mechanisms described covers communication via sending of messages using messaging services like the SUN MICROSYSTEMS® JMS or the MICROSOFT® Messaging Queue, invoking remote messages, or explicitly activating threads, but the described invention is independent of the underlying communication mechanism and may also be applied to other mechanisms, like Web Service calls. One prerequisite for a successful application of the present invention is that the communication mechanism allows adding correlation information to sent messages as out-of-band information.

The present invention generates correlation information which allows reconstructing the chronological execution sequence of parts of distributed transactions executed on different hosts, even if the clocks of the hosts are not synchronized.

Referring now to FIG. 1, therein a monitored application 101 is shown which is running within a virtual machine 102. An agent 103 is injected into the virtual machine 102, which intercepts the loading of original bytecode 106, performed by the native loader 105, and captures the original bytecode 106.

Each agent 103 is provided with a unique agentId 104, which is added to messages sent by the agent 103 and thus allows distinguishing messages received from different agents 103.

The captured bytecode 106 is sent to an instrumentation engine 108. The captured bytecode may be sent via a computer network 118. The instrumentation engine 108 extracts meta-data from the received original bytecode 106. The meta-data is used to identify and select the parts of the original bytecode which are augmented with sensor code. The bytecode parts include of but are not limited to class definitions, method definitions and constant pools. The selection of the bytecode parts may be based on explicitly specified method and class names, identifying single methods or classes, or it may use a rule based system where one rule may match multiple classes or methods. Sensor code is placed in the selected parts of the original bytecode 106 and the instrumented bytecode 107 is sent back to the agent 103 which forwards the instrumented bytecode 107 to the bytecode loading process of the virtual machine 102 which loads the instrumented bytecode 107 instead of the original bytecode 106. Sending the instrumented bytecode 107 may be performed via a computer network 118.

The instrumentation engine instruments 108 methods which should be monitored 110 with entry sensors 111 to detect invocations of monitored methods and exit sensors 112, which detect when execution of monitored methods is finished. Exit sensors detect both normal method exits and exits caused by an unhandled exception. It should be noted that a distinction between both exit types is necessary for a monitoring system to provide correct monitoring information. But this distinction does not foster the understanding of the present information and is thus omitted here.

The instrumentation engine 108 also places tagging sensors 114 in methods initiating an interaction with other threads or virtual machines, like methods sending synchronous or asynchronous messages using messaging oriented middleware, methods preparing network messages representing remote message invocations, or methods initiating an interaction with another thread within the same virtual machine. Those tagging sensors 114 extract correlation information from the thread local storage, which is created by entry sensors 111 and store it in a place where it is accessible for the target threads. Placement of tagging sensors 114 may also include insertion of additional member variables via bytecode manipulation to store the extracted correlation information.

Additionally, tag extraction sensors 116 are placed in methods that receive interactions from other threads, like methods receiving synchronous or asynchronous messages, methods receiving messages representing remote method invocations or methods starting a new thread. Those methods are subsumed here as thread activation methods 115. Tag extraction sensors 116 build the counterpart to tagging sensors 114. The tag extraction sensors store received correlation information within the thread local storage, where it is accessible for other sensors 111.

Allocation methods 119, which like the method "new" which creates a new object of a specific type, or the methods "readObject" or "readSerialData", which receive serialized input data and create new objects which are initialized with the serialized data, are instrumented with an allocation entry sensor 120 and an allocation exit sensor 121.

Synchronization methods 122, which may be synchronized blocks, methods like "wait", "join", etc. which temporarily suspend execution of a transaction, to e.g. synchronize a transaction with other concurrent transactions, are instrumented with a synchronization entry sensor 123 and synchronization exit sensor 124.

The instrumentation engine incrementally builds a sensor context repository 109, which includes context data related to the placed sensors. The context data is retrieved form metadata extracted from the received original bytecode 106 and may include but is not limited to the name of the class and method where the sensor is placed. Each sensor context data entry may be tagged with a unique sensorId. Placed sensors send this sensorId with every message, which allows correlating measurement data received with the messages with the context of the related sensor, without including context information in each sent message.

FIG. 2 shows a sensor context node 201, which is used to store context information related to a placed sensor. The sensorId 202 may uniquely identify the sensor that is related to the context information stored in a sensor context node 201.

Additionally, a sensor metadata node provides sensor metadata 203 which includes but is not limited to a sensor type, identifying the type of the sensor which may e.g. be a timing sensor type, measuring execution times or a counting sensor type, counting the executions of a method or suchlike; the name of the class which contains the sensor; the name of the method the sensor is injected to; the signature of the method; and the line number of the source code where the sensor is placed.

Referring to FIG. 3, showing a parent thread 301 which is interacting with a child thread 302. The information required to correlate individual method invocations within one thread to a call stack, is stored in the local storage of the threads, within a tag info node 801.

The parent thread 301 enters an instrumented method 110, and the entry sensor 111 of the instrumented method 110 is executed. A start path event node 801 is sent to the agent 103 if the execution of the instrumented method starts a new execution path and a path event node 831 is sent afterwards, regardless if a new execution path is started or not. The agent 103 in turn sends the event node to a correlation engine 307, which may be performed using a computer network 118. If execution of the instrumented method 110 invokes a method that performs a thread switch 303, the tagging sensor 114 of the method is executed. The tagging sensor 114 extracts correlation information required to identify the parent thread 301 and stores it in a parent info node 601 which is attached to the object representing the child thread 302 within the parent thread 301. The object representing the child thread, which may be a "java.lang.Thread" object in SUN MICROSYSTEMS® JAVA™ environments, is also accessible at the child thread 302. Additionally, the tagging sensor sends a path correlation event node 841, which allows the correlation engine 307 to correlate the execution of the child thread 302 with the execution of the instruction within the parent thread 301 that started the child thread 302. On exiting an instrumented method 110, the exit sensor 112 of the method is invoked which sends a path event node 831 indicating a method exit to the agent 103.

On activating the child thread 302, the tag extraction sensor 116 is executed. The tag extraction sensor 116 reads the parent info node 601 stored in the object representing the child thread, creates a tag info node 701 and stores data extracted from the parent info node in the tag info node 701. The tag info node is stored in the thread local storage of the child thread 302.

During the first execution of an instrumented method 110 in the context of the child thread 302, the entry sensor 111 of the instrumented method stores information required to identify the child thread 302 to the tag info node 701 stored in the local storage of the child thread 302. Afterwards it reads the information identifying the parent thread 301 from the tag info node 701 and sends a start path event node 801 which includes information to identify both the parent thread 301 and the child thread 302. Subsequent executions of entry sensors 111 and exit sensors 112 may only send information to identify the child thread 302.

The start path event nodes 801, path event 831 nodes and path correlation nodes 841 are received by a remote correlation engine 307 which transforms the received event nodes into path nodes and incrementally builds representations of the execution paths described by the received event nodes. Transfer of the event nodes may be performed via a computer network 118. The execution path representations are stored in a path repository 308, which may concurrently be accessed by an analysis module 309 to evaluate the available execution path representations and which may also present the analyzed execution paths to the user. The analysis module also accesses the sensor context repository 109 for context information of the sensors that created the event nodes which where used to build the execution paths.

Referring now to FIG. 4, showing a fragment of a transaction that employs remote method invocations. A thread 402 of a client application 401 invokes a remote method which is executed at a server application 406, which may run on a different host connected by a computer network 118. Calling the remote method on the client side 403 invokes a tagging sensor 114 which extracts information including information required to identify the client application 401 and the current thread 402. The extracted information includes but is not limited to a local pathId 703, identifying the current path and an agentId 103, identifying the agent 104 deployed to the application. As there may be only one agent deployed to each application, the agentId 103 also identifies the client application 401. The tagging sensor stores the information in a parent info node 601 which is attached to the message representing the remote method invocation 404. The tagging sensor additionally sends a path correlation event node 841 to the agent which allows determining the sequence of multiple remote method invocations within the body of one instrumented method 110. The message representing the remote method invocation 404 is sent to the server application 405, which may be performed using a computer network 118.

The server application 405 receives the remote method invocation message 404 and executes a remote method service routine 407 to handle the remote method invocation request. A tag extraction sensor 116, instrumented into the service routine extracts the parent info node 601 from the received message and stores the contained information in the tag info node 701 of the current thread 407.

The execution of entry sensors 111 and exit sensors 112 and the handling of different path events are performed as explained in the description of FIG. 3. It should be noted that path events sent from the client application 401 are tagged with the agentId 103 of the client application's agent 104 and path event sent from the server application 405 includes the agentId 103 of the server application's agent 104.

The transfer of parent info nodes 601 along with remote method invocation messages 404 may take the implementation specific characteristics of the underlying remote method invocation protocols into account, but the principle of adding parent info nodes to remote method invocations as out-of-band information remains the same for most protocols.

An exemplary embodiment of the current invention used to trace distributed transactions which involve sending and receiving of messages, using dedicated messaging service infrastructure is depicted in FIG. 5. Current messaging servers provide various methods to transfer messages, including direct sending from one sender to one receiver, or publish-subscribe mechanisms where a publisher adds a message to a topic and multiple subscribers of the topic receive the published message. All those transfer methods may based on sending message objects from one message sender to one or multiple message receivers. Thus it is sufficient to insert correlation information as out-of-band information into the message objects to allow correlation of distributed transactions involving message based communication.

If a method that sends a message 503 via a dedicated messaging server 505 is called, the tagging sensor 114 which is instrumented into the method is executed. The tagging sensor stores correlation information in a parent info node 601 which was extracted from the local tag info 701. The parent info node 601 is attached to the message object 504 before it is sent to the messaging server 505. The message may be sent via a computer network 118. Messaging systems like the SUN MICROSYSTEMS® JMS provide interfaces to add user specific parameters to message objects, which can be used to attach the parent info node 601 to the message object 504.

The messaging server 505 clones the original message 504 and sends those cloned messages 507 to all registered receivers 506, which may be performed using a computer network 118. The receiving applications 506 are notified about the incoming message and methods to receive the message 116 are called. A tag extraction sensor 116 is instrumented to those methods which reads the correlation information of the parent info node 601 from the received message 507 and stores it in the tag info node 701 of the current thread.

The execution of entry sensors 111 and exit sensors 112 and the handling of different path events are performed as explained in the description of FIG. 3. It should be noted that path events sent from the sender application 501 are tagged with the agentId 103 of the sender application's agent 104 and path event sent from the receiver applications 506 contain the agentId 103 of the agents 104 deployed to the receiver applications 506.

FIG. 6 shows a parent info node 601 which is used to transfer correlation information between connected parts of a transaction running in different threads, which may be executed on different hosts, connected by a computer network 118. Information stored in a parent info node contains, but is not limited to an agentId 602, a local pathId 603 and a forkId 604. The agentId 602 of a path info node is initialized with the agentId 104 of the agent 103 which is deployed to the application that generated the parent info node, and uniquely identifies the application that generated the parent info node. The local pathId 603 uniquely identifies the execution of a thread that involved the execution of another thread. The forkId 604 identifies each individual interaction initiated by the thread with other threads, which may be performed by explicitly activating other threads, via remote method invocations, sending of messages or other inter-thread communication mechanisms. The forkId may be incremented each time a thread interacts with another thread.

FIG. 7 depicts a tag info node 701, which is stored in the local storage of a thread. A tag info node 701 stores information required to correlate method calls executed within the local thread in the local data section 720 and information to correlate the local thread with its parent thread in the parent data section 710. The local data 720 section includes but is not limited to an agentId 721, a local pathId, the current call depth 723 and the current forkId 724. The agentId 721 is set to the agentId 104 of the agent 103 deployed to the local application. The local pathId 722 may uniquely identify an execution path of the current thread, the call depth 723 indicates the current depth of nested calls of instrumented methods and the forkId 724 indicates the current number of activations of other threads performed by the current thread.

The parent data section 710 identifies the execution path of the thread that invoked the current thread. It includes but is not limited to a parent agentId 711, a parent local pathId 712 and a forkId 713. The parent agentId 711 identifies the agent deployed to the application that activated the current thread; the parent local pathId 712 identifies the execution of the thread that activated the current thread and the parent forkId 713 identifies the activation of the current thread within all thread activations performed by the parent thread of the current thread.

The different types of event nodes are depicted in FIG. 8. Event nodes are sent from deployed entry sensors 111, exit sensors 112, tagging sensors 114, allocation entry sensors 120, allocation exit sensors 121, synchronization entry sensors 123, and synchronization exit sensors 124 to the agent 103 of the local application, which in turn forwards the event nodes to the correlation engine 307. Additionally, the VM Suspension Handler 1905 sends event nodes directly to the correlation engine in case of a received VM suspension notification. Sending event nodes may be performed using a computer network 118.

FIG. 8a shows a start path event 801, which is sent to indicate the start of a new transaction or the start of the execution of a part of a transaction in a new thread. The parent data section 810 includes data that identifies the thread that started the current thread, whereas the data of the local data section 820 identifies the current thread. The parent data 810 includes but is not limited to a parent agentId 811, a parent local pathId 812 and a forkId 813. The parent agentId 811, parent local pathId 812 and forkId 813 identify application, thread execution and the activation of the current thread within all thread activations performed by the parent thread of the current thread. The local data 820 includes but is not limited to an agentId 821, a local pathId 822 and payload data 823. AgentId 821 and local pathId 822 identify the local application and the execution of the current thread. The payload data 823 includes but is not limited to data describing the current thread, like its name or id.

Path event nodes, as depicted in FIG. 8b are used to indicate entry or exit of instrumented methods 110. A path event node contains an agentId 832 and a local pathId 833 which identify the application and the thread execution that originated the path event node. The entry/exit indicator 834 allows distinguishing between event nodes created by entry sensors 111 and exit sensors 112. The sensorId 835 is a key to the sensor context repository 109, and allows the reconstruction of the context of the sensor that created the path event node 831. The call depth 836 indicates the nesting depth of the instrumented method that created the path event node. The payload data 837 includes information about the current execution of an instrumented method 110. Payload data 837 may include but is not limited to method execution time, synchronization time or wait time of the instrumented method.

Path correlation event nodes 841, which are shown in FIG. 8c, are used to indicate that a thread activated another thread, either explicitly, by calling a remote method or by sending a message. Path correlation event nodes allow reconstructing the sequence of thread activations performed by a thread. A path correlation node contains an agentId 842 and a local pathId 843, which identify the application and the thread execution that originated the path correlation event node. The sensorId 844 allows the reconstruction of the context of the sensor that created the path correlation event node 841 and the call depth 845 indicates the nesting depth. The forkId 846 indicates the sequence number of the thread activation described by the path correlation event.

FIG. 8d describes allocation event nodes 851, which model heap memory allocations for creation of new objects. Such an event node contains an agentId 852, a local pathId 853, an entry/exit indicator 854 to indicate if an event was sent on entry or exit of an allocating method, a sensorId 855, the call depth 856, which indicates the nesting depth of the allocating method, and a payload data section 857 which may contain additional information about the allocated object, like its type.

FIG. 8e describes synchronization event nodes 861, which indicates time spent for synchronization during execution of the transaction. Such an event node contains an agentId 862, a local pathId 863, an entry/exit indicator 864 to indicate if an event was sent on entry or exit of an allocating method, a sensorId 865, the call depth 866, which indicates the nesting depth of the synchronization method, and a payload data section 867 which may contain additional information about the performed synchronization, like the type of the used synchronization method.

FIG. 8f describes runtime suspension event nodes 871, which indicates time elapsed during full or partial suspensions of the underlying virtual machine, which occured during execution of the transaction. Such an event node contains an agentId 872, a local pathId 873, an entry/exit indicator 874 to indicate if the event was sent start or stop of the runtime suspension, a sensorId 875, the call depth 876, which indicates the nesting depth of the synchronization method, a full suspension indicator 877, which indicates if the entire virtual machine was suspended, or only a partial suspension, which may have only affected a single thread, occurred, and a payload data section 878 which may contain additional information about the performed runtime suspension.

FIG. 9 shows the process of transferring correlation information between to threads in case of explicit thread activation.

FIG. 9a displays the execution of a tagging sensor 114, which is invoked in turn of the initialization of a thread switch. First, the tagging sensor 114 fetches the tag info node 701 from the thread local storage in step 901. Then, it queries if the local data 720 of the tag info node 701 is set in step 902. If the local data is not set, execution of the tagging sensor is terminated 906, because not existing data indicates that this thread switch is not performed by a traced transaction. Otherwise, the tagging sensor 114 creates a parent info node 601 which is initialized with the local data 720 of the tag info node 701 in step 903. In step 904, the parent info node 601 is stored in the object representing the thread which will be activated. An additional field to store the parent info node 601 was added to this object by the instrumentation engine via bytecode manipulation. In a final step 905, a path correlation event node 841 is initialized with the data from the tag info node 701 and afterwards sent to the correlation engine 307. Additionally, the forkId 724 of the tag info node 701 is incremented.

FIG. 9b shows the execution of a tag extraction sensor 116 which is executed on the start of a thread. In an initial step 910, it is checked if the object representing the current thread contains a valid parent info node 701. In case of no existing parent info node, the execution of the tag extraction sensor 116 is terminated in step 914. Otherwise execution continues with step 911 which creates a new tag info node 701 and resets its local data section 720. In the subsequent step 912, the information extracted from the parent info node 601 is stored in the parent data section 710 of the tag info node 701, and in a final step 913 the tag info node is stored in the local storage of the current thread.

FIG. 10 shows the transfer of correlation information within a remote method call, whereas FIG. 10a describes how a tagging sensor is attaching correlation information in form of a parent info node 601 to a message representing a remote method invocation 404 at the caller side of the remote method. In step 1001, the tag info node 701 is retrieved from the thread local storage and step 1002 checks if the local data 720 is initialized. If the local data is initialized, execution continues with step 1003 by creating and initializing a parent info node 601 with data from the tag info node 701 retrieved in step 1001. In step 1004, the parent info node 601 is attached to the message representing the remote method call 404. In a final step 1005, a path correlation event 841 is initialized and sent to the correlation engine 307 and the forkId 724 of the tag info node 701 is incremented.

FIG. 10b displays how a tag extraction sensor 116 extracts the parent info received with a remote method message 404 on execution of the remote method service routine 407. In a first step 1010 the sensor checks if the remote method message 404 contains a parent info node 601. If a parent info node is found, it creates a tag info node 701 and resets its local data section 720 in step 1011, initializes the parent data section 710 with data from the received parent info node 601 in step 1012 and stores the tag info node in the thread local storage in step 1013.

The transfer of correlation information within messages is depicted in FIG. 11. FIG. 11a shows how a tagging sensor stores correlation information in a message parameter. In an initial step 1101, the tag info node 701 is retrieved from the thread local storage, and in a subsequent step 1102 the tagging sensor 114 checks if the local data 720 of the tag info node 701 is set. If the local data is set, a parent info node 601 is created and initialized in step 1103, and in step 1104 the parent info node is stored in the message which is going to be sent 504 as an additional message parameter. Finally, in step 1105, the tagging sensor 114 initializes and sends a path correlation event node 841 and increments the forkId 724 of the tag info node 701.

FIG. 11b shows how a tag extraction sensor 116, which is invoked in course of receiving a message, extracts correlation information from the received message 507 and stores it in the thread local storage. In a first step 1110, the sensor checks if the received message contains a parameter with a parent info node 601. If a parent info node is available, a tag info node 701 is created, its local data is reset in step 1111, and parent data of the tag info node 701 is initialized with data from the received parent info node in step 1112. Finally, the tag info node 701 is stored in the thread local storage in step 1113.

Transfer of correlation information between communicating threads as described in present invention is not restricted to explicit thread switch, remote method invocation and messaging. Any communication channel between threads that allows adding user defined data can be used to transfer correlation information. As an example, correlation information could be transferred between the client and the server of a web service request by adding an additional header field to the request representing the web service call. The additional header field may be used to transfer correlation information.

The execution of an entry sensor 111 is depicted in FIG. 12. Calls to entry sensors are inserted at the start of each instrumented method 110 by the instrumentation engine 108. In an initial step 1201, the entry sensor checks if the local data 720 of the tag info node 701 in the thread local storage is initialized. If no tag info node is found in the thread local storage, a new tag info node is created, local and parent data are reset and the new tag info node is added to the thread local storage. If the local data of the tag info node is set, payload data is acquired in step 1202. Payload data may contain, but is not restricted to execution time, synchronization time or argument values of the current method. In step 1203, the call depth 723 of the tag info node 701 is incremented and in a subsequent step 1204, a path event node 831 is created and initialized with a agentId 721, local pathId 722 and call depth 723 from the tag info node 701. Additionally the sensorId 835, which identifies the context of the entry sensor 111, is set. The entry/exit indicator 834 is set to "entry" and the acquired payload data is stored in the path event node. In step 1205 the path event node is sent to the correlation engine 307.

In case of not set local data 720, the entry sensor 111 executes step 1206 and generates a new local pathId 722, which uniquely identifies a thread execution within the scope of a virtual machine. Additionally, it retrieves the agentId 104 from the agent 103 deployed to the application. Both local pathId 722 and agentId 104 are stored in the tag info node 701 of the local thread storage, and call depth 723 and forkId 724 of the tag info node 701 are reset.

In a subsequent step 1207, payload data specific for a started local execution path is acquired, which may contain the start time of the path, or an indicator about the event causing the start of the execution, like handling a message or executing a remote method.

In step 1208 the entry sensor creates a start path event 801, sets local pathId 821, agentId 822 with data from the tag info node 701, stores the acquired payload data to the payload data 823. Afterwards the entry sensor 111 checks in step 1209 if the parent data 710 of the tag info node 701 is set. If the parent data 710 is set, the entry sensor initializes the parent data 810 of the start path event node 801 with the parent data 710 of the tag info node 701 in step 1210. Otherwise, parent data 810 of the start path event node 801 is reset in step 1211. Afterwards, the start path event 801 is sent in step 1212 and execution of the entry sensor continues with step 1202 and subsequent steps.

The execution of an exit sensor 112 is depicted in FIG. 13. Each time an instrumented method 110 is exited, an exit sensor 112 may be invoked. The exit sensor checks in an initial step 1301 if the local data 720 of the tag info node 701 in the local thread storage is set. If no local data is set, the current execution of the method belongs to no monitored execution path. In this case, the execution of the exit sensor 112 is terminated in step 1308. Otherwise, execution continues with step 1302 which acquires pay load data of the exit sensor 112. The payload data may contain, but is not restricted to execution time, synchronization time or CPU time of the current method. Afterwards, a path event node 831 is created in step 1303 and its agentId 832, local pathId 833 and call depth 836 are initialized with the corresponding values from the tag info node 701 of the thread local storage. The sensorId 835 is initialized with a value identifying the current method, the entry/exit indicator 834 is set to "exit" and the payload data 837 is initialized with the previously acquired values. In step 1304 the initialized path event node is sent to the correlation engine 307 and the call depth 723 of the tag info node in the thread local storage is decremented in step 1305. If it is detected in step 1306 that the call depth has now a value of 0, then the tag info node 701 in the local thread storage is reset in step 1307. A call depth of 0 indicates that execution of the outermost instrumented method within the current execution of the current thread is finished and thus the values of the tag info node 701 are no longer valid.

FIG. 14 depicts different types of path nodes, which are used by the correlation engine to represent monitored execution paths. A start path node 1401 which is shown in FIG. 14a contains a parent path section 1410, which is used to store information to correlate the current execution path with a potential parent execution path which triggered the current execution path. The parent path info section 1410 contains a parent pathId 1411, a parent agentId 1412, which are used to identify the parent execution path, and a forkId 1413 which is used to identify the position within the parent execution path where the current execution path was activated. The path info section 1420 includes a pathId 1421 to identify the execution path within the virtual machine, an agentId 1422 to identify the virtual machine that executed the path, payload data 1423 which may contain information about the execution path, like name or id of the thread that performed the execution, a field path nodes 1424, which includes a list of path nodes 1431 and path correlation nodes 1441 belonging to the path. The entries of the path nodes list 1424 of a start path node 1401 are sorted according to the arrival time of the corresponding method entry path event nodes 831 and path correlation event nodes 841 at the correlation engine 307. Path event nodes 831 and path correlation nodes 841 are sent to the correlation engine 108 via one network communication channel and arrive at the correlation engine in the same sequence as they were sent by the agent 103. Thus, the sequence of the path nodes in a path node list 1424 is equivalent to the execution order of the methods represented by the path nodes.

The field temporary correlation nodes 1425 contains path correlation nodes 1441 which link the current execution path with associated child execution paths, where data describing the child paths arrived at the correlation engine 307 before the corresponding path correlation event node arrived. This situation may occur e.g. if in case of a remote method invocation, the network latency between the calling application and the correlation engine is higher than the network latency between the callee application and the correlation engine.

FIG. 14b describes a path node 1431 which represents one execution of an instrumented 110 method within an execution path. A path node contains payload data 1432, sensorId 1433 and call depth 1434. Payload data contains data describing one execution of an instrumented method, which may contain but is not limited to execution time, synchronization time, CPU time or argument values. The sensorId 1433 allows the reconstructing of the context of the sensor that caused the created of the path node 1431. The field call depth 1434 stores the nesting level of the current instrumented method.

FIG. 14c shows a path correlation node 1441 which is used to map interdependencies between different parts of distributed execution paths. A path correlation node contains the fields, forkId 1442, sensorId 1443, call depth 1444 and child path references 1445. The forkId 1442 identifies activations of other threads, performed by the current thread, within the scope of the current thread. Activations of other threads may be performed by explicit thread activation, remote method invocation or sending of messages. The list child path references 1445 may include references to paths triggered by the thread activation described by the current path correlation node 1441. The functionality of sensorId 1443 and call depth 1444 is as specified in the description of FIG. 14b.

FIG. 14d, FIG. 14e and FIG. 14f describe allocation path nodes 1451, synchronization path nodes 1461 and runtime suspension nodes 1471. Functionality of sensorId (1453, 1463 and 1473) and call depth (1454, 1464 and 1474) is as explained in description of FIG. 14b.

The allocation payload data 1452 of an allocation path node 1451 may contain but is not limited to information about the new allocated object, like the type of the allocated object, the used allocation method or an indicator indicating whether a plain new object was created, or a serialized object was deserialized.

The synchronization payload data 1462 of a synchronization path node 1461 may contain but is not limited to information about the type of the used synchronization method, and the runtime suspension payload data 1472 of a runtime suspension path node 1471 may contain additional information about the occurred runtime suspension.

The process depicted in FIG. 15 shows the processing of an incoming start path event node 801 by the correlation engine 307. A start path event node 801 is transformed into a start path node 1401, which is inserted into the path repository 308. Each start path node 801 represents one execution path of a thread.

After receiving a start path event node 801, the correlation engine first queries the path repository 308 for an existing start path node 1401 with the same pathId and agentId as the received start path event in step 1501. If such a start path node is found, the payload data of the start path node is updated with the payload data of the received start path event node 801 in step 1504. Otherwise, a new start path node 1401 is created and inserted into the path repository 308 and its path info section 1420 is initialized with data from the local data section 820 of the incoming start path event node 801 in step 1503. The correlation engine checks in step 1505, if the parent data section 810 of the received start path event node 801 is initialized, and resets the parent path info section 1410 of the created or updated start path node 1401 in step 1506, if the parent data 810 of the received start path event node is not initialized, and terminates the processing of the received start path event in step 1517. Otherwise, the correlation engine 307 initializes the parent path info section 1410 of the start path node 1401 with the data from the received start path event node 801 in step 1507. Afterwards, it queries the path repository 308 for a start path node 1401 representing the parent path addressed by the received start path event node 801 in step 1508. If no matching start path node 1401 is found, the correlation engine creates a new start path node 1401 and initializes its pathId 1421 and agentId 1422 with parent local pathId 812 and parent agentId 811 from the received start path event node 801 in step 1510. Additionally, a path correlation node 1441 is created, and added to the temporary correlation nodes 1425 of the start path node 1401 created in step 1510. The forkId 1442 of the created path correlation node 1441 is initialized with the forkId 813 of the received start path event node 801, and a reference to the start path node 1401, created or updated in step 1503 or 1504, which represents the path described by the received start path event node 801, is added to the child path references 1445 of the created path correlation node 1441. SensorId 1443 and call depth 1444 of the path correlation node are reset. After execution of step 1510, processing of the received start path event is terminated in step 1517.

If a start path node 1401 representing the parent execution path was found in step 1508, execution continues with step 1511, where the correlation engine queries the path nodes 1424 of the found parent path for a path correlation node with a forkId 1442 as the forkId 813 of the received start path event node 801. If such a path correlation node 1441 is found, a reference to the start path node 1401 which was created or updated in step 1503 or 1504 is added to the child path references of the path correlation node in step 1516, and the processing of the received start path event node 801 is terminated in step 1517.

If no path correlation node 1441 is found in step 1511, execution continues in step 1513, and the temporary correlation nodes of the start path node 1401 are queried for a path correlation node with a forkId 1442 as the received forkId 813. If a corresponding path correlation node is found, execution continues with step 1516, which adds a reference to the created or updated start path node 1401 to the child path referenced 1445 of the found path correlation node 1441. Otherwise, a new path correlation node 1441 is created and added to the temporary correlation nodes 1425 of the start path node 1401 in step 1515. The forkId 1442 of the created path correlation node 1441 is set to the forkId of the received start path event 801 and sensorId 1443 and call depth 1444 are reset. After step 1515, execution continues with step 1516.

The processing of an incoming path correlation event 841 by the correlation engine 307 is shown in FIG. 16. On receiving a path correlation event 841, the correlation engine first checks if a start path node 1401 with pathId 1421 and agentId 1422 equal to local pathId 843 and agentId 842 of the received path correlation event node 841 exists in the path repository 308. If no corresponding start path node 1401 is found, the path correlation event 1441 is ignored (step 1605) and processing of the event is finished.

Otherwise, the temporary correlation nodes 1425 of the start path node 1401 found in step 1601 are queried for a path correlation node 1441 with forkId 1442 matching the forkId 846 of the received path correlation event node 841. If the temporary correlation nodes 1425 do not contain a matching path correlation node 1441, a new path correlation node is created, initialized with the data of the received path correlation event node 841 and appended to the path nodes 1424 of the start path node 1401 found in step 1601. Otherwise, the path correlation node 1441 found in step 1603 is removed from the temporary correlation nodes 1425, call depth 1444 and sensorId 1443 are initialized with the corresponding values of the received path correlation event node 841, and the path correlation node 1441 is appended to the path nodes 1424 in step 1607.

FIG. 17 describes the processing of an incoming path event node 831 by the correlation engine 307. In step 1701 the correlation engine 307 checks if a start path node 1401 with agentId 1422 and pathId 1421 equal to the local agentId 832 and local pathId 833 of the received path event node exists in the path repository 308. If no matching start path node 1401 is found, the incoming path event node 801 is ignored (step 1703) and processing of the event is finished.

Otherwise, the correlation engine evaluates the entry/exit indicator 834 of the path event node 831 to determine if the received path event node described entry or exit of an instrumented method 110 in step 1705. If the received path event node 831 describes a method entry, a new path node 1431 is created, payload data 1432, sensorId 1433 and call depth 1434 are initialized with the corresponding values of the received path event node 831 and the path node 1431 is appended to the path nodes 1424 of the start path node 1401 found in step 1701. If the correlation engine 307 detects in step 1705 that the received path event node 831 describes a method exit, the correlation engine 307 queries the path nodes 1424 of the start path node 1401 found in step 1701 for a path node 1431 representing the corresponding method entry event in step 1706. The corresponding path node 1431 representing the corresponding method entry is detected by scanning the path nodes 1424 of the start path node 1401 found in step 1701 backwards, beginning with the last added path node 1431 until a path node 1431 describing a method entry with the same call depth 1434 as the received path event node 831, which describes a method entry is found, and which has the same sensorId 1433 as the received path event node 831. The first detected path node matching these criteria is the path node 1431 that describes the corresponding method entry.

In a final step 1707, the payload data 1432 of the path node 1431 found in step 1706 is merged with the payload 837 of the received path event node 831. Merging of payload may contain but is not limited to calculating the execution duration of the method call described by the path node 1431, adding captured method return values to the payload 1432 of the path node 1431, or setting a flag in the path node 1431 indicating that execution of the described method is terminated.

The separate signalization of method entries and method exits by the agent 103 allows the correlation engine 307 to provide valid descriptions of execution paths while execution of the paths is still ongoing. Together with a concurrent access of correlation engine 307 and analysis module 309 to the path repository 308, this provides real-time visualization of execution paths, while execution is still ongoing. This mechanism is especially useful in visualizing the execution of paths which are blocked, because it allows the visualization of all method entries, up to the method that caused the block.

FIG. 18 describes the execution of an allocation sensor. A parent thread 301 executes an instrumented method, which in turn executes an instrumented allocation method 119. On entry of the allocation method, the allocation entry sensor 120 is executed and on exit of the allocation method, the allocation exit sensor 121 is executed. Both sensors send event nodes to the agent 103, which in turn forwards thes event nodes to the correlation engine 307. For a detailed description of the processes performed by the allocation entry and exit sensors please refer to descriptions of FIG. 21a and FIG. 21b.

FIG. 19 describes the execution of an allocation sensor. A parent thread 301 executes an instrumented method, which in turn executes an instrumented synchronization method 122. On entry of the synchronization method, the synchronization entry sensor 123 is executed and on exit of the synchronization method, the synchronization exit sensor 124 is executed. Both sensors send event nodes to the agent 103, which in turn forwards thes event nodes to the correlation engine 307. For a detailed description of the processes performed by the allocation entry and exit sensors please refer to descriptions of FIG. 22a and FIG. 22b.

FIG. 20 describes the architecture used to monitor runtime suspension of the virtual machine 102. To run maintenance tasks, like running a major garbage collection, or performing a recompilation of bytecode to increase performance, full or partial suspension of execution of the application 101 is required. Monitoring and debugging interfaces, like the JVMPI interface provided by the SUN MICROSYSTEMS® JAVA™ Virtual Machine, provide notifications on such suspensions, which may be used to detect runtime suspensions which occurred during execution of a transaction.

A VM Suspension Notification Handler 2005 is deployed to the virtual machine runtime 2001 and is registered get notified on relevant events indicating full or partial runtime suspensions. Those runtime suspension notifications are modeled here by VM suspension notifications 2002, which may map to garbage collection start/stop notifications etc. Such a VM suspension notification may contain an entry/exit indicator 2003, indicating if the VM enters or exits the suspension state. Additionally, it may contain a threadId 2004, which identifies a suspended thread in case of a partial suspension, affecting only one thread. The threadId 2004 may be set to a special value, indicating a full suspension, affecting all threads.

The VM Suspension Notification Handler 2005 receives VM suspension notifications 2002, transforms them into appropriate event nodes and sends them to the correlation engine 307. For a detailed description of this process, please refer to description of FIG. 23.

FIG. 21 describes the process performed during executing allocation entry and exit sensors. FIG. 21a shows the process performed on entry of an allocation method. In a first step 2101, it is checked if the thread local storage contains a valid tag info node 701, with set local tag info 720. If no local tag info 720 is available, the process is exited in step 2108. Otherwise, the local tag info 720 is received from the thread local storage in step 2102, and a local boolean variable "trace" is declared and initialized with false at step 2103. In step 2104 an allocation stack is fetched from the thread local storage. If no allocation stack is available, a new, empty one is created and stored in the thread local storage.

The allocation stack contains references to objects created by the allocation method. If the allocation method in turn calls other instrumented allocation methods which create other instances, references to those instances will be pushed on top of the stack. The local "trace" variable and the allocation stack are used to avoid sending allocation entry/exit events in case of delegating constructors. A delegating constructor is an allocating method, which in turn calls other allocating methods on the same object instance to allow code reuse.

Step 2105 fetches the top level element from the allocation stack and compares it with the currently allocated object. If step 2106 detects that the top level element equals the currently allocated object, the process is exited in step 2110. Otherwise, step 2107 increments the call depth, 2108 creates, initializes and sends an allocation event 851 indicating the entry of an allocation method 119 and step 2109 pushes a reference to the currently allocated object to the allocation stack.

FIG. 21b shows the process performed on exiting an allocation method 119. In a first step 2120, it is checked if the local variable "trace" is available and set to "true". If no local variable "trace" is available, or it is set to "false", the process is terminated in step 2126. Otherwise, a new allocation even node 851 indicating an exited allocation method 119 is created, initialized and sent to the correlation engine 307. Step 2122 decrements the call depth and step 2123 removes the reference to the currently allocated object from the allocation stack. If it is detected that the allocation stack is now empty in step 2124, it is removed from the thread local storage in step 2125.

FIG. 22 depicts the process of entering and exiting a synchronization method 122, whereas FIG. 22a shows the process of executing a synchronization entry sensor 123 and FIG. 22b shows the process of executing a synchronization exit sensor 124.

On executing a synchronization entry sensor 123, it is first checked in step 2201 if a tag info node 701 with initialized local data 720 is available in the thread local storage. If no initialized local data is available, the process is exited in step 2205. Otherwise, the tag info node is fetched from thread local storage in step 2202, call depth is increased in step 2203 a synchronization event 861, indicating entry of a synchronization method 122 is created, initialized and sent to the correlation engine in step 2205.

On executing a synchronization exit sensor 124, it is first checked in step 2210 if a tag info node 701 with initialized local data 720 is available in the thread local storage. If no initialized local data is available, the process is exited in step 2214. Otherwise, the tag info node is fetched from thread local storage and a synchronization event 861, indicating exiting a synchronization method 122 is created in step 2211, and call depth is increased in step 2212.

The process of transforming incoming VM suspension notifications 2002 into runtime suspension event nodes 871 is shown in FIG. 23. In an initial step 2301 it is checked, if an agent 103 is deployed to the virtual machine 102. If no agent is available, the process is exited in step 2309. Otherwise a new runtime suspension event node 871 is created and initialized with the agentId 104 of the agent 103 and the entry/exit indicator of the received VM suspension notification 2002 in step 2302. In step 2303, the threadId 2004 is fetched from the received VM suspension notification 2002 and checked if it indicates a thread suspension or a full suspension. If the threadId 2004 indicates a full suspension, the full suspension indicator of the runtime suspension event node 871 is set in step 2304 and the event node 872 is sent in step 2308.

If the treadId 2004 indicates a thread specific suspension, the tag info node 701 is fetched from the thread referred by the received threadId 2004 in step 2305. Step 2306 checks if a tag info node is available and contains valid local data 720. If no valid local data is available, the process is exited in step 2309. Otherwise, the local pathId 722 is fetched from the local data 720 and stored in the created runtime suspension event node 871. Afterwards, the event node 872 is sent in step 2308.

FIG. 24 describes the processing of an incoming path event node 851 by the correlation engine 307. In step 2401 the correlation engine 307 checks if a start path node 1401 with agentId 1422 and pathId 1421 equal to the local agentId 832 and local pathId 833 of the received allocation event node 851 exists in the path repository 308. If no matching start path node 1401 is found, the incoming path event node 801 is ignored (step 2403) and processing of the event is finished.

Otherwise, the correlation engine evaluates the entry/exit indicator 854 of the path event node 851 to determine if the received path event node described entry or exit of an instrumented method 119 in step 2405. If the received path event node 851 describes an allocation method entry, a new path node 1451 is created, allocation payload data 1452, sensorId 1453 and call depth 1454 are initialized with the corresponding values of the received path event node 851 and the path node 1451 is appended to the path nodes 1424 of the start path node 1401 found in step 2401. If the correlation engine 307 detects in step 2405 that the received allocation path event node 851 describes an allocation method exit, the correlation engine 307 queries the path nodes 1424 of the start path node 1401 found in step 1701 for a allocation path node 1451 representing the corresponding method entry event in step 2406. The corresponding path node 1451 representing the corresponding method entry is detected by scanning the path nodes 1424 of the start path node 1401 found in step 1701 backwards, beginning with the last added allocation path node 1451 until an allocation path node 1451 describing an allocation method entry with the same call depth 1454 as the received path event node 851, which describes an allocation method entry is found, and which has the same sensorId 1453 as the received allocation path event node 851. The first detected path node matching these criteria is the allocation path node 1451 that describes the corresponding method entry.

In a final step 2407, the allocation payload data 1452 of the path node 1451 found in step 2406 is merged with the allocation payload 857 of the received allocation path event node 851. Merging of payload may contain but is not limited to calculating the execution duration of the allocation method call described by the path node 1451.

FIG. 25 describes the process of correlating synchronization event nodes 861 to a transaction path. The same process is performed as for received allocation path events 851, with the exception that synchronization event nodes 861 are correlated instead of allocation path events 851. For details please see description of FIG. 24.

FIG. 25 describes the process of correlating runtime suspension event nodes 871 to a transaction path. In a first step 2601 it is checked if the received event node 871 describes a suspension of a specific thread. In case of a suspension of a specific thread, the same process which is performed for received allocation path events 851, with the exception that runtime suspension event nodes 871 indicating the suspension of a specific thread are correlated instead of allocation path events 851. For detailed information please see description of FIG. 24.

If the received runtime suspension event 871 indicates that a full suspension occurred, step 2609 is performed which queries the correlation engine 307 for all start path nodes 1401 where the agentId 1422 matches the agentId 872 of the received runtime suspension event 871 and where not all expected event nodes indicating method exits were received. The received set of start path nodes describes all paths of the currently suspended virtual machine which are not finished. The received runtime suspension event 871 is correlated to the transaction path represented by each of those start path events 1401. Correlation is performed in the same way as described for thread specific suspension, except that querying an associated path is not required, because the affected paths were already determined in step 2609.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A method for tracing a distributed transaction executed on at least one host system connected by a computer network, the method comprising:
   (A) for each of a plurality of parts of the distributed transaction, creating and collecting part correlation information uniquely identifying the part;
   (B) using the part correlation information for the plurality of parts of the distributed transaction to generate relationship data representing relationships among the plurality of parts;
   (C) for each of the plurality of parts of the distributed transaction, creating and collecting method correlation information identifying call nesting level and call sequence of individual invocations of an instrumented method executed in the part; and
   (D) using the identified relationships to generate part measurement data representing performance metrics of each of the plurality of parts of the distributed transaction, and storing the part measurement data;
   (E) using the method correlation information to generate method measurement data representing performance metrics of the individual method invocations, and storing the method measurement data;
   wherein (A) comprises:
   (A)(1) collecting correlation information for a first thread;
   (A)(2) transferring the correlation information for the first thread to a second thread activated by the first thread;
   (A)(3) before (A)(1), placing a tagging sensor in a part of the distributed transaction corresponding to the first thread;

(A)(4) before (A)(2), placing a tag extraction sensor in a part of the distributed transaction corresponding to the second thread;

wherein (A)(1) comprises using the tagging sensor to collect and store the correlation information for the first thread and wherein (A)(2) comprises using the tag extraction sensor to extract the stored correlation information for the first thread and make the stored correlation information available in the second thread; and wherein (B) comprises using the correlation information to identify a parent-child relationship between the first thread and the second thread.

2. The method of claim 1, wherein the correlation information for a particular one of the plurality of parts includes a unique identifier of a virtual machine on which the particular one of the plurality of parts executes.

3. The method of claim 2, wherein the correlation information for the particular one of the plurality of parts uniquely identifies an execution path of the particular one of the plurality of parts executed through the virtual machine.

4. The method of claim 1, wherein (A), (B), (C), and (D) are performed with constant memory consumption by a virtual machine within which the distributed transaction executes, independent of instrumented method call depth of the plurality of threads.

5. The method of claim 4, wherein (A) and (C) comprise creating the correlation information within a monitored application and collecting it outside of the monitored application, wherein (B) and (E) are performed outside of the monitored application, and wherein (D) comprises converting the correlation information and part measurement data into performance metrics of the distributed transaction outside of the monitored application.

6. The method of claim 1, wherein the plurality of parts are distributed across a plurality of processes.

7. The method of claim 1, wherein the plurality of parts are distributed across a plurality of virtual machines.

8. The method of claim 7, wherein the plurality of virtual machines comprises a plurality of virtual machines of different types.

9. The method of claim 8, wherein the plurality of virtual machines comprises a Java virtual machine and a .NET CLR virtual machine.

10. The method of claim 1, wherein (A)(1) further comprises using the tagging sensor to store the correlation information for the first thread in a place which is accessible to the second thread.

11. The method of claim 10, wherein (A)(3) comprises placing the tagging sensor in a method for thread-switching and wherein (A)(4) comprises placing the tag extraction sensor in a method for thread-activating.

12. The method of claim 1, further comprising:
(F) transmitting a plurality of clones of a message to a plurality of recipients, wherein each of the plurality of message clones includes the correlation information.

13. The method of claim 1, wherein the distributed transaction includes a parent transaction and a plurality of child transactions of the parent transaction, and wherein collecting the correlation information includes collecting a start sequence of the plurality of child transactions.

14. The method of claim 13, wherein at least one of the plurality of child transactions includes multiple child transactions.

15. The method of claim 13, wherein the start sequence of the plurality of child transactions is maintained within one method invocation of the parent transaction.

16. The method of claim 1, wherein (A) comprises:
(A)(1) placing a tagging sensor in a remote method call method of the distributed transaction corresponding to the first thread;
(A)(2) placing a tag extraction sensor in a remote method service method of the distributed transaction corresponding to the second thread; and
(A)(3) using the tagging sensor to collect the correlation information for the first thread and store the collected correlation information in a remote method call message; and
(A)(4) using the tag extraction to extract the correlation information from the remote method call message and to make the extracted correlation information available in the second thread.

17. The method of claim 1, wherein (A) comprises:
(A)(1) placing a tagging sensor in a send message method of the distributed transaction corresponding to the first thread;
(A)(2) placing a tag extraction sensor in a message receiving method of the distributed transaction corresponding to a second thread;
(A)(3) using the tagging sensor to collect the correlation information for the first thread and to store the correlation information in the plurality of message clones; and
(A)(4) using the tag extraction sensor to extract the correlation information from one of the plurality of message clones and to make the extracted correlation information available in the second thread.

18. The method of claim 17, wherein
(A)(2) comprises: placing a plurality of tag extraction sensors in message receiving methods of a plurality of threads in the distributed transaction, wherein the plurality of threads includes the second thread; and wherein
(A)(4) comprises: using the plurality of tag extraction sensors to extract the correlation information from the plurality of message clones received by the plurality of threads and to make the extracted correlation information available in the plurality of threads.

19. The method of claim 1, wherein the first distributed transaction is performed by an application, and wherein (A)-(E) are performed without modifying source code of the application.

20. The method of claim 1, comprising performing (A)-(E) for each of a plurality of distributed transactions, wherein the plurality of distributed transactions are performed concurrently.

21. The method of claim 1, wherein (C) comprises, for each of the plurality of parts of the distributed transaction, creating and collecting method correlation information identifying call nesting level and call sequence of individual invocations of each of a plurality of instrumented methods executed in the part.

22. A method for tracing a distributed transaction executed on at least one host system connected by a computer network, the method comprising:
(A) for each of a plurality of parts of the distributed transaction, creating and collecting part correlation information uniquely identifying the part;
(B) using the part correlation information for the plurality of parts of the distributed transaction to generate relationship data representing relationships among the plurality of parts;
(C) for each of the plurality of parts of the distributed transaction, creating and collecting method correlation information identifying call nesting level and call sequence of individual invocations of an instrumented method executed in the part; and
(D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data;
(F) before (A), for each of the plurality of parts of the distributed transaction, placing an entry sensor at the beginning of a method corresponding to the part;
and wherein (A) comprises:
  (A)(1) for each invocation of a method corresponding to a particular one of the plurality of parts of the distributed transaction:
    (A)(1)(a) using the entry sensor to store and retrieve correlation information and measurement data for the method invocation for the part;
and wherein (A) further comprises, for each invocation of the method corresponding to the particular one of the plurality of parts of the distributed transaction:
    (A)(1)(b) placing an exit sensor at an exit point of the method corresponding to the part; and
    (A)(1)(c) using the exit sensor to store and retrieve correlation information and measurement data for the method invocation of the method corresponding to the part;
wherein the entry sensor comprises an allocation entry sensor placed in a method for performing heap memory allocation for creation of new objects, wherein the exit sensor comprises an allocation exit sensor placed in the method for performing heap memory allocation for creation of new objects.

23. The method of claim 22, wherein (A)(1) further comprises:
  (A)(1)(d) using the entry sensor to acquire trace information for the part.

24. The method of claim 23, wherein the allocation entry sensor and the allocation exit sensor are adapted to detect heap memory allocation for creation of new objects performed during execution of the distributed transaction.

25. The method of claim 24, further comprising correlating detected heap memory allocation for creation of new objects with the method invocations which caused the allocations.

26. The method of claim 23, further comprising using the allocation entry sensor and the allocation exit sensor to handle calls to delegating constructors to report only one allocation, even if object allocation is delegated between constructors.

27. The method of claim 22, wherein (A)(1)(a) comprises using thread-local storage to store and retrieve the correlation information for the part.

28. A method for tracing a distributed transaction executed on at least one host system connected by a computer network, the method comprising:
(A) for each of a plurality of parts of the distributed transaction, creating and collecting part correlation information uniquely identifying the part;
(B) using the part correlation information for the plurality of parts of the distributed transaction to generate relationship data representing relationships among the plurality of parts;
(C) for each of the plurality of parts of the distributed transaction, creating and collecting method correlation information identifying call nesting level and call sequence of individual invocations of an instrumented method executed in the part; and
(D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data;
(F) before (A), for each of the plurality of parts of the distributed transaction, placing an entry sensor at the beginning of a method corresponding to the part;
and wherein (A) comprises:
  (A)(1) for each invocation of a method corresponding to a particular one of the plurality of parts of the distributed transaction:
    (A)(1)(a) using the entry sensor to store and retrieve correlation information and measurement data for the method invocation for the part;
wherein (A) further comprises, for each invocation of the method corresponding to the particular one of the plurality of parts of the distributed transaction:
    (A)(1)(b) placing an exit sensor at an exit point of the method corresponding to the part; and
    (A)(1)(c) using the exit sensor to store and retrieve correlation information and measurement data for the method invocation of the method corresponding to the part;
wherein the entry sensor comprises a synchronization entry sensor placed in a method for detecting synchronization with other concurrent transactions, and wherein the exit sensor comprises a synchronization exit sensor placed in the method for detecting synchronization with other concurrent transactions.

29. The method of claim 28, wherein the synchronization entry sensor and the synchronization exit sensor are adapted to detect synchronization with other concurrent transactions performed during execution of the distributed transaction.

30. The method of claim 29, further comprising correlating detected synchronization with other transactions to the method invocations which caused the synchronization.

31. A method for tracing a distributed transaction executed on at least one host system connected by a computer network, the method comprising:
(A) for each of a plurality of parts of the distributed transaction, creating and collecting part correlation information uniquely identifying the part;
(B) using the part correlation information for the plurality of parts of the distributed transaction to generate relationship data representing relationships among the plurality of parts;
(C) for each of the plurality of parts of the distributed transaction, creating and collecting method correlation information identifying call nesting level and call sequence of individual invocations of an instrumented method executed in the part; and
(D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data;

(F) before (A), for each of the plurality of parts of the distributed transaction, placing an entry sensor at the beginning of a method corresponding to the part;
and wherein (A) comprises:
(A)(1) for each invocation of a method corresponding to a particular one of the plurality of parts of the distributed transaction:
(A)(1)(a) using the entry sensor to store and retrieve correlation information and measurement data for the method invocation for the part;
wherein (A)(1)(a) comprises using the entry sensor to store and retrieve correlation information and measurement data for the part prior to completion of the method corresponding to the part.

32. The method of claim 31, wherein (E) is performed while execution of the individual method invocations is ongoing.

33. The method of claim 31, wherein (A)(1) further comprises:
(A)(1)(b) using the entry sensor to provide information to locate a blocked transaction.

34. The method of claim 33, wherein (A)(1)(b) comprises using the entry sensor to provide information about a method invocation that block the blocked transaction.

35. A method for tracing a distributed transaction executed on at least one host system connected by a computer network, the method comprising:
(A) for each of a plurality of parts of the distributed transaction, creating and collecting part correlation information uniquely identifying the part;
(B) using the part correlation information for the plurality of parts of the distributed transaction to generate relationship data representing relationships among the plurality of parts;
(C) for each of the plurality of parts of the distributed transaction, creating and collecting method correlation information identifying call nesting level and call sequence of individual invocations of an instrumented method executed in the part; and
(D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data; and
(F) using the correlation information to detect runtime suspensions and to classify the detected runtime suspensions as full runtime suspensions and thread specific runtime suspensions.

36. The method of claim 35, further comprising:
(G) correlating the detected runtime suspensions with at least some of the plurality of parts of the distributed transaction.

37. A non-transitory computer-readable medium comprising computer program instructions for execution by a computer processor to perform a method for tracing a distributed transaction executed on at least one host system connected by a computer network, the method comprising:
(A) for each of a plurality of parts of the distributed transaction, creating and collecting part correlation information uniquely identifying the part;
(B) using the part correlation information for the plurality of parts of the distributed transaction to generate relationship data representing relationships among the plurality of parts;
(C) for each of the plurality of parts of the distributed transaction, creating and collecting method correlation information identifying call nesting level and call sequence of individual invocations of an instrumented method executed in the part; and
(D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data;
wherein (A) comprises:
(A)(1) collecting correlation information for a first thread;
(A)(2) transferring the correlation information for the first thread to a second thread activated by the first thread;
(A)(3) before (A)(1), placing a tagging sensor in a part of the distributed transaction corresponding to the first thread;
(A)(4) before (A)(2), placing a tag extraction sensor in a part of the distributed transaction corresponding to the second thread;
wherein (A)(1) comprises using the tagging sensor to collect and store the correlation information for the first thread and wherein (A)(2) comprises using the tag extraction sensor to extract the stored correlation information for the first thread and make the stored correlation information available in the second thread; and
wherein (B) comprises using the correlation information to identify a parent-child relationship between the first thread and the second thread.

38. The computer-readable medium of claim 37, wherein the correlation information for a particular one of the plurality of parts includes a unique identifier of a virtual machine on which the particular one of the plurality of parts executes.

39. The computer-readable medium of claim 38, wherein the correlation information for the particular one of the plurality of parts uniquely identifies an execution path of the particular one of the plurality of parts executed through the virtual machine.

40. The computer-readable medium of claim 37, wherein (A), (B), (C), and (D) are performed with constant memory consumption by a virtual machine within which the distributed transaction executes, independent of instrumented method call depth of the plurality of threads.

41. The computer-readable medium of claim 40, wherein (A) and (C) comprise creating the correlation information within a monitored application and collecting it outside of the monitored application, wherein (B) and (E) are performed outside of the monitored application, and wherein (D) comprises converting the correlation information and part measurement data into performance metrics of the distributed transaction outside of the monitored application.

42. The computer-readable medium of claim 37, wherein the plurality of parts are distributed across a plurality of processes.

43. The computer-readable medium of claim 37, wherein the plurality of parts are distributed across a plurality of virtual machines.

44. The computer-readable medium of claim 43, wherein the plurality of virtual machines comprises a plurality of virtual machines of different types.

45. The computer-readable medium of claim 44, wherein the plurality of virtual machines comprises a Java virtual machine and a .NET CLR virtual machine.

46. The computer-readable medium of claim 37, wherein (A)(1) further comprises using the tagging sensor to store the correlation information for the first thread in a place which is accessible to the second thread.

47. The computer-readable medium of claim 46, wherein (A)(3) comprises placing the tagging sensor in a method for thread-switching and wherein (A)(4) comprises placing the tag extraction sensor in a method for thread-activating.

48. The computer-readable medium of claim 37, wherein the method further comprises:
(F) transmitting a plurality of clones of a message to a plurality of recipients, wherein each of the plurality of message clones includes the correlation information.

49. The computer-readable medium of claim 37, wherein the distributed transaction includes a parent transaction and a plurality of child transactions of the parent transaction, and wherein collecting the correlation information includes collecting a start sequence of the plurality of child transactions.

50. The computer-readable medium of claim 49, wherein at least one of the plurality of child transactions includes multiple child transactions.

51. The computer-readable medium of claim 49, wherein the start sequence of the plurality of child transactions is maintained within one method invocation of the parent transaction.

52. The computer-readable medium of claim 37, wherein (A) comprises:
(A)(1) placing a tagging sensor in a remote method call method of the distributed transaction corresponding to the first thread;
(A)(2) placing a tag extraction sensor in a remote method service method of the distributed transaction corresponding to the second thread; and
(A)(3) using the tagging sensor to collect the correlation information for the first thread and store the collected correlation information in a remote method call message; and
(A)(4) using the tag extraction to extract the correlation information from the remote method call message and to make the extracted correlation information available in the second thread.

53. The computer-readable medium of claim 37, wherein (A) comprises:
(A)(1) placing a tagging sensor in a send message method of the distributed transaction corresponding to the first thread;
(A)(2) placing a tag extraction sensor in a message receiving method of the distributed transaction corresponding to a second thread;
(A)(3) using the tagging sensor to collect the correlation information for the first thread and to store the correlation information in the plurality of message clones; and
(A)(4) using the tag extraction sensor to extract the correlation information from one of the plurality of message clones and to make the extracted correlation information available in the second thread.

54. The computer-readable medium of claim 37, wherein (A)(2) comprises: placing a plurality of tag extraction sensors in message receiving methods of a plurality of threads in the distributed transaction, wherein the plurality of threads includes the second thread; and wherein (A)(4) comprises: using the plurality of tag extraction sensors to extract the correlation information from the plurality of message clones received by the plurality of threads and to make the extracted correlation information available in the plurality of threads.

55. The computer-readable medium of claim 37, wherein the first distributed transaction is performed by an application, and wherein (A)-(E) are performed without modifying source code of the application.

56. The computer-readable medium of claim 37, comprising performing (A)-(E) for each of a plurality of distributed transactions, wherein the plurality of distributed transactions are performed concurrently.

57. The computer-readable medium of claim 37, wherein (C) comprises, for each of the plurality of parts of the distributed transaction, creating and collecting method correlation information identifying call nesting level and call sequence of individual invocations of each of a plurality of instrumented methods executed in the part.

58. A non-transitory computer-readable medium comprising computer program instructions for execution by a computer processor to perform a method for tracing a distributed transaction executed on at least one host system connected by a computer network, wherein the method comprises:
(A) for each of a plurality of parts of the distributed transaction, creating and collecting part correlation information uniquely identifying the part;
(B) using the part correlation information for the plurality of parts of the distributed transaction to generate relationship data representing relationships among the plurality of parts;
(C) for each of the plurality of parts of the distributed transaction, creating and collecting method correlation information identifying call nesting level and call sequence of individual invocations of an instrumented method executed in the part; and
(D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data;
(F) before (A), for each of the plurality of parts of the distributed transaction, placing an entry sensor at the beginning of a method corresponding to the part;
and wherein (A) comprises:
(A)(1) for each invocation of a method corresponding to a particular one of the plurality of parts of the distributed transaction:
(A)(1)(a) using the entry sensor to store and retrieve correlation information and measurement data for the method invocation for the part.

59. The computer-readable medium of claim 58, wherein (A)(1) further comprises:
(A)(1)(b) using the entry sensor to acquire trace information for the part.

60. The computer-readable medium of claim 59, wherein the allocation entry sensor and the allocation exit sensor are adapted to detect heap memory allocation for creation of new objects performed during execution of the distributed transaction.

61. The computer-readable medium of claim 60, wherein the method further comprises correlating detected heap memory allocation for creation of new objects with the method invocations which caused the allocations.

62. The computer-readable medium of claim 59, wherein the method further comprises using the allocation entry sensor and the allocation exit sensor to handle calls to delegating constructors to report only one allocation, even if object allocation is delegated between constructors.

63. The computer-readable medium of claim 58, wherein (A)(1)(a) comprises using thread-local storage to store and retrieve the correlation information for the part.

64. A non-transitory computer-readable medium comprising computer program instructions for execution by a computer processor to perform a method for tracing a distributed transaction executed on at least one host system connected by a computer network, wherein the method comprises:
  (A) for each of a plurality of parts of the distributed transaction, creating and collecting part correlation information uniquely identifying the part;
  (B) using the part correlation information for the plurality of parts of the distributed transaction to generate relationship data representing relationships among the plurality of parts;
  (C) for each of the plurality of parts of the distributed transaction, creating and collecting method correlation information identifying call nesting level and call sequence of individual invocations of an instrumented method executed in the part; and
  (D) using the identified relationships to generate part measurement data representing performance metrics of each of the plurality of parts of the distributed transaction, and storing the part measurement data;
  (E) using the method correlation information to generate method measurement data representing performance metrics of the individual method invocations, and storing the method measurement data;
  (G) before (A), for each of the plurality of parts of the distributed transaction, placing an entry sensor at the beginning of a method corresponding to the part;
  and wherein (A) comprises:
    (A)(2) for each invocation of a method corresponding to a particular one of the plurality of parts of the distributed transaction:
      (A)(1)(d) using the entry sensor to store and retrieve correlation information and measurement data for the method invocation for the part;
  wherein (A) further comprises, for each invocation of the method corresponding to the particular one of the plurality of parts of the distributed transaction:
    (A)(1)(e) placing an exit sensor at an exit point of the method corresponding to the part; and
    (A)(1)(f) using the exit sensor to store and retrieve correlation information and measurement data for the method invocation of the method corresponding to the part;
  wherein the entry sensor comprises a synchronization entry sensor placed in a method for detecting synchronization with other concurrent transactions, and wherein the exit sensor comprises a synchronization exit sensor placed in the method for detecting synchronization with other concurrent transactions.

65. The computer-readable medium of claim 64, wherein the synchronization entry sensor and the synchronization exit sensor are adapted to detect synchronization with other concurrent transactions performed during execution of the distributed transaction.

66. The computer-readable medium of claim 65, wherein the method further comprises correlating detected synchronization with other transactions to the method invocations which caused the synchronization.

67. A non-transitory computer-readable medium comprising computer program instructions for execution by a computer processor to perform a method for tracing a distributed transaction executed on at least one host system connected by a computer network, wherein the method comprises:
  (A) for each of a plurality of parts of the distributed transaction, creating and collecting part correlation information uniquely identifying the part;
  (B) using the part correlation information for the plurality of parts of the distributed transaction to generate relationship data representing relationships among the plurality of parts;
  (C) for each of the plurality of parts of the distributed transaction, creating and collecting method correlation information identifying call nesting level and call sequence of individual invocations of an instrumented method executed in the part; and
  (D) using the identified relationships to generate part measurement data representing performance metrics of each of the plurality of parts of the distributed transaction, and storing the part measurement data;
  (E) using the method correlation information to generate method measurement data representing performance metrics of the individual method invocations, and storing the method measurement data;
  (F) before (A), for each of the plurality of parts of the distributed transaction, placing an entry sensor at the beginning of a method corresponding to the part;
  and wherein (A) comprises:
    (A)(2) for each invocation of a method corresponding to a particular one of the plurality of parts of the distributed transaction:
      (A)(1)(b) using the entry sensor to store and retrieve correlation information and measurement data for the method invocation for the part;
  wherein (A)(1)(a) comprises using the entry sensor to store and retrieve correlation information and measurement data for the part prior to completion of the method corresponding to the part.

68. The computer-readable medium of claim 67, wherein (E) is performed while execution of the individual method invocations is ongoing.

69. The computer-readable medium of claim 67, wherein (A)(1) further comprises:
  (A)(1)(b) using the entry sensor to provide information to locate a blocked transation.

70. The computer-readable medium of claim 69, wherein (A)(1)(b) comprises using the entry sensor to provide information about a method invocation that block the blocked transaction.

71. A non-transitory computer-readable medium comprising computer program instructions for execution by a computer processor to perform a method for tracing a distributed transaction executed on at least one host system connected by a computer network, wherein the method comprises:
  (A) for each of a plurality of parts of the distributed transaction, creating and collecting part correlation information uniquely identifying the part;
  (B) using the part correlation information for the plurality of parts of the distributed transaction to generate relationship data representing relationships among the plurality of parts;
  (C) for each of the plurality of parts of the distributed transaction, creating and collecting method correlation information identifying call nesting level and call sequence of individual invocations of an instrumented method executed in the part; and (D) using the identified relationships to generate part measurement data representing performance metrics of each of the plurality of parts of the distributed transaction, and storing the part measurement data;
(E) using the method correlation information to generate method measurement data representing performance metrics of the individual method invocations, and storing the method measurement data; and
(F) using the correlation information to detect runtime suspensions and to classify the detected runtime suspensions as full runtime suspensions and thread specific runtime suspensions.

72. The computer-readable medium of claim 71, wherein the method further comprises:
(G) correlating the detected runtime suspensions with at least some of the plurality of parts of the distributed transaction.

* * * * *

UNITED STATES PATENT AND TRADEMARK OFFICE
CERTIFICATE OF CORRECTION

| | | |
|---|---|---|
| PATENT NO. | : 8,234,631 B2 | Page 1 of 1 |
| APPLICATION NO. | : 12/191409 | |
| DATED | : July 31, 2012 | |
| INVENTOR(S) | : Bernd Greifeneder et al. | |

It is certified that error appears in the above-identified patent and that said Letters Patent is hereby corrected as shown below:

In the Specification:

In column 1, line 21, delete "BACKGROUND OF THE INVENTION" and insert the same on Col. 1, Line 22, as a heading.

In column 1, line 35, delete "coupled" and insert -- coupled application --, therefor.

In column 4, lines 14-15, delete "transactions;" and insert -- transactions. --, therefor.

In column 11, line 39, delete "tum" and insert -- turn --, therefor.

In column 12, line 21, delete "where" and insert -- were --, therefor.

In column 15, line 26, delete "occured" and insert -- occurred --, therefor.

In column 21, line 28, delete "thes" and insert -- these --, therefor.

In column 21, line 39, delete "thes" and insert -- these --, therefor.

In column 23, line 15, delete "treadId" and insert -- threadId --, therefor.

In the Claims:

In column 34, line 45, in Claim 69, delete "transation." and insert -- transaction. --, therefor.

Signed and Sealed this
Eighteenth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,234,631 B2
APPLICATION NO. : 12/191409
DATED : July 31, 2012
INVENTOR(S) : Bernd Greifeneder and Markus Pfleger Page 1 of 2

It is certified that error appears in the above-identified patent and that said Letters Patent is hereby corrected as shown below:

In the Drawings:

In FIG. 4, replace 104 with 103 and replace 103 with 104, as shown in the attached replacement FIG. 4.

In the Specification:

In column 12, line 33, delete "agentId 103, identifying the agent 104" and insert --agentId 104, identifying the agent 103--, therefor.

In column 12, line 35, delete "the agentId 103" and insert --the agentId 104--, therefor.

In column 12, line 56, delete "the agentId 103 of the client application's agent 104" and insert --the agentId 104 of the client application's agent 103--, therefor.

In column 12, line 58, delete "agentId 103 of the server application's agent 104" and insert --agentId 104 of the server application's agent 103--, therefor.

In column 13, line 37, delete "the agentId 103 of the sender's application agent 104" and insert --the agentId 104 of the sender's application agent 103--, therefor.

In column 13, line 39, delete "agentId 103 of the agents 104" and insert --agentId 104 of the agents 103--, therefor.

Signed and Sealed this
Eighth Day of July, 2014

Michelle K. Lee
*Deputy Director of the United States Patent and Trademark Office*

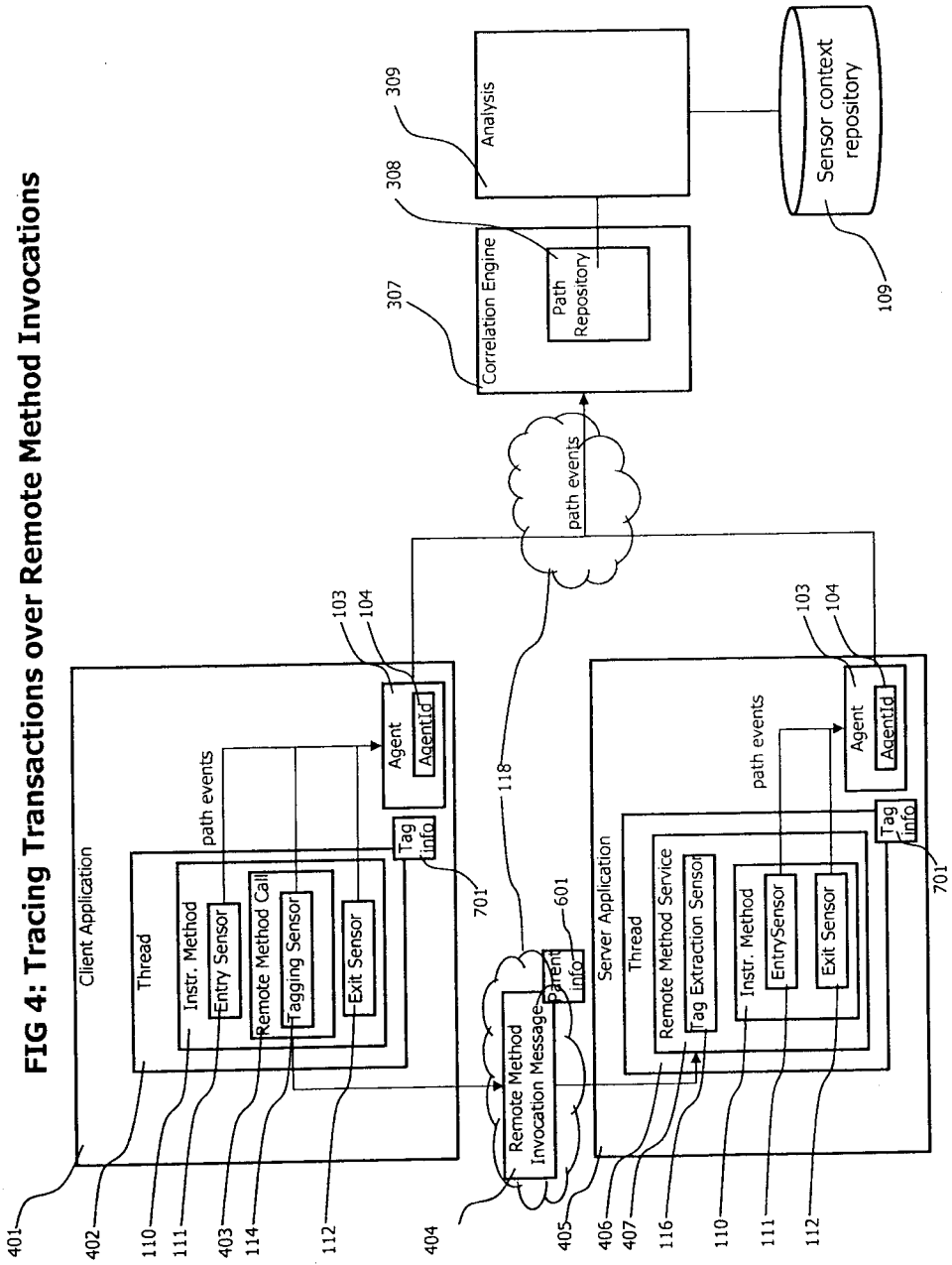
FIG 4: Tracing Transactions over Remote Method Invocations

UNITED STATES PATENT AND TRADEMARK OFFICE
CERTIFICATE OF CORRECTION

PATENT NO.       : 8,234,631 B2
APPLICATION NO.  : 12/191409
DATED            : July 31, 2012
INVENTOR(S)      : Bernd Greifeneder et al.

Page 1 of 1

It is certified that error appears in the above-identified patent and that said Letters Patent is hereby corrected as shown below:

In the drawings

On Sheet 17 of 26, Box. 1704, in Figure 17, line 1, delete "initialialize" and insert -- initialize --, therefor.

On Sheet 24 of 26, Box. 2404, in Figure 24, line 2, delete "initialialize" and insert -- initialize --, therefor.

On Sheet 24 of 26, Box. 2407, in Figure 24, line 1, delete "allococation" and insert -- allocation --, therefor.

On Sheet 24 of 26, Box. 2407, in Figure 24, line 2, delete "withallocation" and insert -- with allocation --, therefor.

On Sheet 25 of 26, Box. 2504, in Figure 25, line 2, delete "initialialize" and insert -- initialize --, therefor.

On Sheet 25 of 26, Box. 2507, in Figure 25, line 2, delete "withallocation" and insert -- with allocation --, therefor.

On Sheet 26 of 26, Box. 2607, in Figure 26, line 2, delete "initialialize" and insert -- initialize --, therefor.

On Sheet 26 of 26, Box. 2606, in Figure 26, line 2, delete "withallocation" and insert -- with allocation --, therefor.

Signed and Sealed this
Twenty-first Day of June, 2016

Michelle K. Lee
*Director of the United States Patent and Trademark Office*